(12) United States Patent
Larsen et al.

(10) Patent No.: US 9,736,434 B2
(45) Date of Patent: Aug. 15, 2017

(54) APPARATUS AND METHOD FOR DISPLAYING A VIEW CORRESPONDING TO A POSITION OF A MOBILE DISPLAY DEVICE

(75) Inventors: Ty Larsen, Everett, WA (US); Edwin C. Lim, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 516 days.

(21) Appl. No.: 13/532,555

(22) Filed: Jun. 25, 2012

(65) Prior Publication Data

US 2013/0342695 A1    Dec. 26, 2013

(51) Int. Cl.
| | |
|---|---|
| *H04N 7/00* | (2011.01) |
| *H04N 7/18* | (2006.01) |
| *B64D 47/08* | (2006.01) |
| *B64D 43/00* | (2006.01) |
| *B64D 11/00* | (2006.01) |

(52) U.S. Cl.
CPC .............. *H04N 7/181* (2013.01); *B64D 43/00* (2013.01); *B64D 47/08* (2013.01); *B64D 2011/0061* (2013.01)

(58) Field of Classification Search
CPC .... H04B 7/185; H04N 7/173; H04N 7/17318; H04N 21/25841; H04N 21/41407; H04N 21/42202; H04N 21/4223; H04N 21/4524; H04N 21/4722; H04N 21/4788; H04N 21/6125; H04N 21/6131; H04N 7/18; G06F 3/147; G06F 17/3087; H04M 1/72572
USPC ......................................................... 348/148
See application file for complete search history.

(56) References Cited

U.S. PATENT DOCUMENTS

| | | | |
|---|---|---|---|
| 7,966,024 B2* | 6/2011 | Cohen ........................ 455/456.3 |
| 8,180,396 B2* | 5/2012 | Athsani et al. ............... 455/557 |
| 8,181,212 B2* | 5/2012 | Sigal ............................. 725/113 |
| 9,332,229 B2* | 5/2016 | Ishimoto .................. H04N 7/18 |
| 2007/0162942 A1* | 7/2007 | Hamynen et al. ............ 725/105 |
| 2009/0195652 A1* | 8/2009 | Gal ............................... 348/148 |
| 2011/0291918 A1 | 12/2011 | Surber et al. |
| 2014/0092206 A1* | 4/2014 | Boucourt ............... B64D 47/08 |
| | | | 348/36 |

OTHER PUBLICATIONS

Bilton, "Gogole to Sell Heads-Up Display Glasses by Year's End," The New York Times, Bits, Feb. 2012, 12 pages, accessed Jun. 25, 2012 http://bits.blogs.nytimes.com/2012/02/21/google-to-sell-terminator-style-glasses-by-years-end/.
Adi, "Augmented Reality Hype is Here!", Oddcast, Sep. 2009, 4 pages,accessed Jun. 25, 2012 http://blog.oddcast.com/2009/09/augmented-reality-hype-is-here.html.
Extended European Search Report, dated Apr. 7, 2014, regarding Application No. 13168902.8, 6 pages.

* cited by examiner

*Primary Examiner* — Frank Huang
(74) *Attorney, Agent, or Firm* — Yee & Associates, P.C.

(57) ABSTRACT

A method and apparatus comprising a view generator. The view generator is configured to identify a position of a mobile display device relative to an exterior of a vehicle. The view generator is further configured to identify image data from a sensor system for the vehicle that corresponds to a field of view of the mobile display device from the position of the mobile display device relative to the vehicle. The view generator is further configured to display an external view for the vehicle on the mobile display device using the image data.

19 Claims, 19 Drawing Sheets

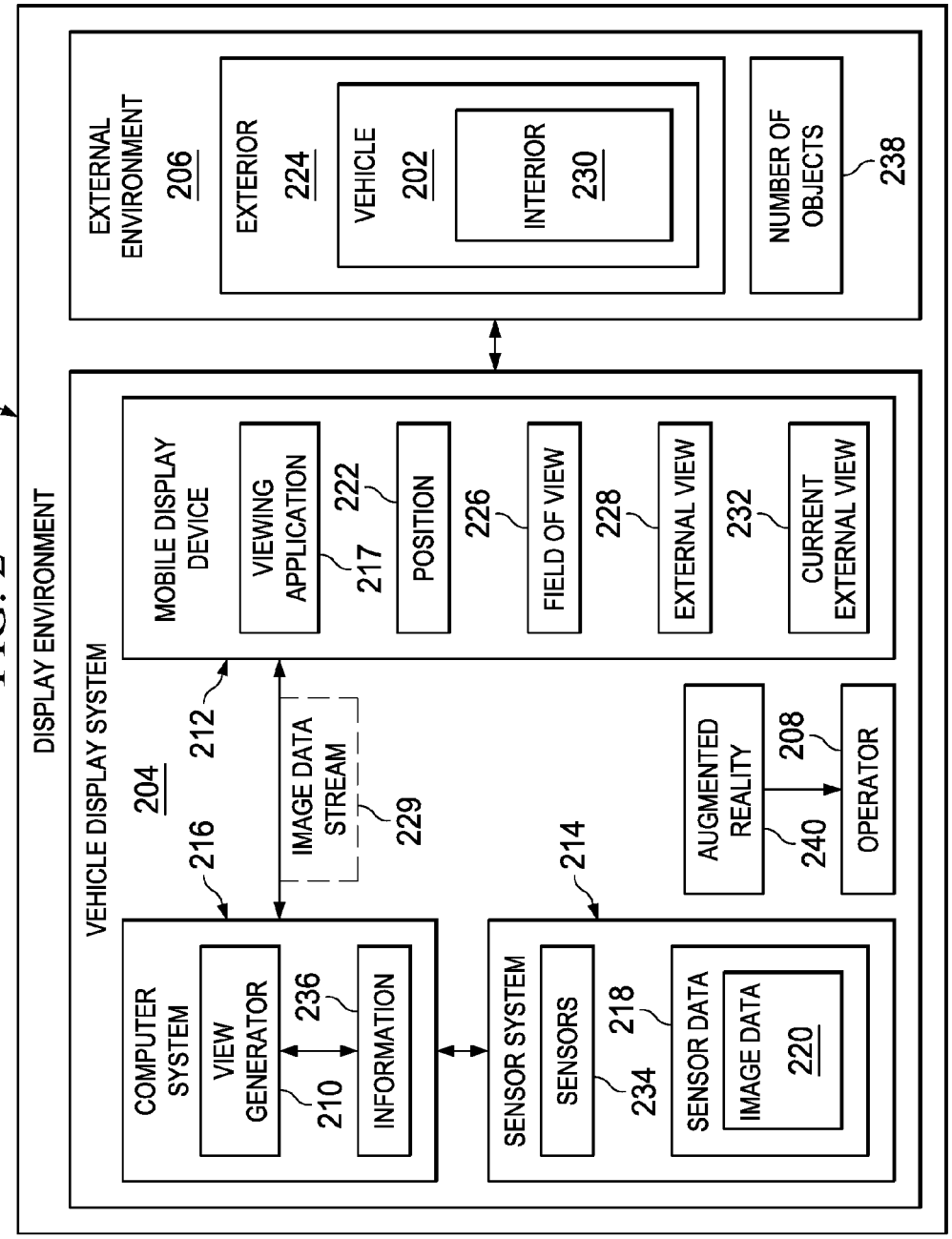

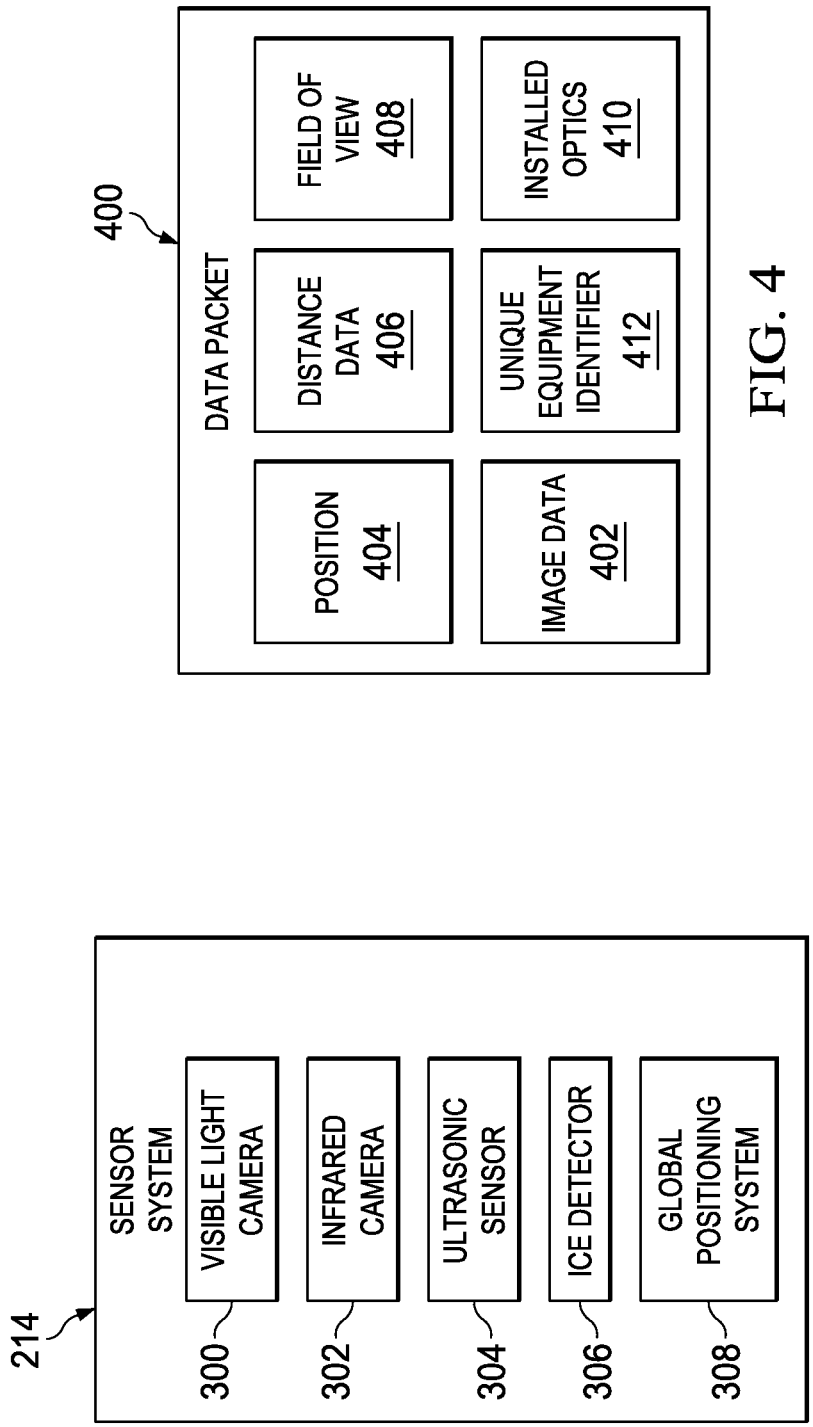

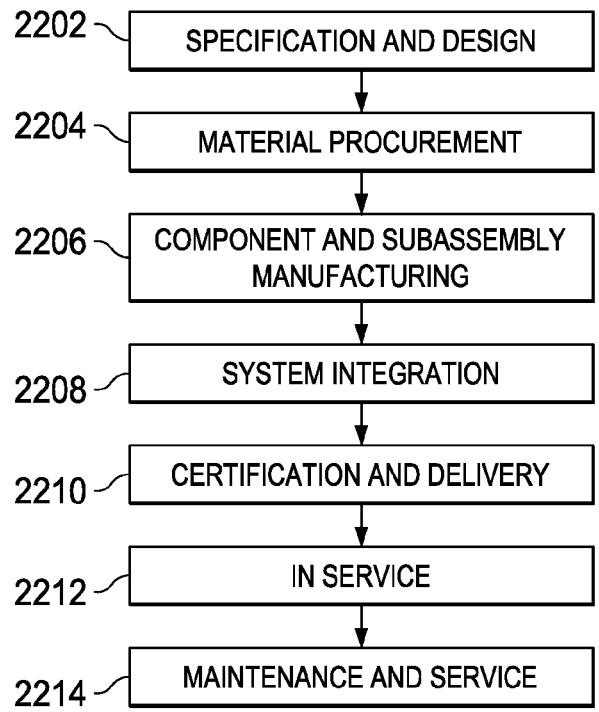
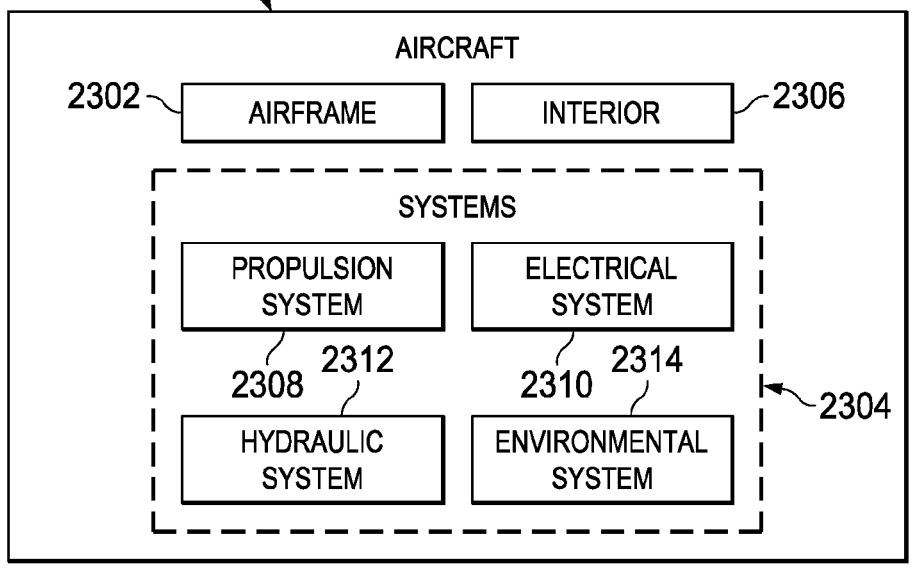

APPARATUS AND METHOD FOR DISPLAYING A VIEW CORRESPONDING TO A POSITION OF A MOBILE DISPLAY DEVICE

BACKGROUND INFORMATION

1. Field

The present disclosure relates generally to vehicles and, in particular, to displaying information about the exterior environment around a vehicle. Still more particularly, the present disclosure relates to a method and apparatus for displaying information about the exterior environment around the vehicle using a mobile device.

2. Background

In operating vehicles, the operator of a vehicle typically looks through windows in the vehicle to see the environment around the vehicle. Depending on the design of the vehicle, the field of view provided by the windows in the vehicle may be more limited than desired. The field of view is the extent of the environment that can be seen at any given moment in time.

An aircraft is an example of a vehicle that may have a field of view that is limited. A pilot is currently only able to see a limited field of view from the windows in the flight deck of the aircraft. This field of view is sufficient during flight of the aircraft.

However, when the aircraft is on the ground, performing operations with the limited field of view from the windows in the flight deck of the aircraft may be more difficult than desired. For example, the view of the environment outside of the aircraft may make performing operations such as flight checks more difficult. For example, visual observations of the outside of the aircraft may be more difficult to make from the flight deck. As a result, some of the separation observations may need to be made by the pilot walking around the exterior of the aircraft or exiting the flight deck and looking through windows in the passenger cabin.

In another example, taxiing in the aircraft may be more challenging with the limited field of view from the windows in the flight deck of the aircraft. For example, with the field of view from the flight deck of the aircraft, seeing whether clearance is present for the wing of an aircraft with respect to a building or other structure may be difficult to perform.

Therefore, it would be desirable to have a method and apparatus that takes into account at least some of the issues discussed above, as well as other possible issues.

SUMMARY

In one illustrative embodiment, an apparatus comprises a view generator. The view generator is configured to identify a position of a mobile display device relative to an exterior of a vehicle. The view generator is further configured to identify image data from a sensor system for the vehicle that corresponds to a field of view of the mobile display device from the position of the mobile display device relative to the vehicle. The view generator is further configured to display an external view for the vehicle on the mobile display device using the image data.

In another illustrative embodiment, an apparatus comprises a view generator. The view generator configured to identify a position of a mobile display device relative to an exterior of a location in a vehicle. The view generator is further configured to identify image data from a sensor system for the vehicle that corresponds to a field of view of the mobile display device from the position of the mobile display device relative to the exterior of the vehicle. The view generator is further configured to display an external view of the vehicle on the mobile display device using the image data.

In yet another illustrative embodiment, a method for displaying an external view of a vehicle is present. A position of a mobile display device is identified relative to an exterior of the vehicle. Image data is identified from a sensor system for the vehicle that corresponds to a field of view of the mobile display device from the position of the mobile display device. The external view for the vehicle is displayed on the mobile display device using the image data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is an illustration of a block diagram of a display environment in accordance with an illustrative embodiment;

FIG. 3 is an illustration of a block diagram of a sensor system in accordance with an illustrative embodiment;

FIG. 4 is an illustration of a data packet in accordance with an illustrative embodiment;

FIG. 22 is an illustration of an aircraft manufacturing and service method in accordance with an illustrative embodiment; and FIG. 23 is an illustration of an aircraft in which an illustrative embodiment may be implemented.

DETAILED DESCRIPTION

The illustrative embodiments recognize and take into account one or more different considerations. For example, the illustrative embodiments recognize and take into account that sensor systems may be used on an aircraft to provide additional information about the environment around the aircraft.

The illustrative embodiments also recognize and take into account that cameras may be associated with the aircraft to provide information to the pilot of the aircraft. Information in the form of images, such as those in a video, are displayed on a display device in the aircraft.

The illustrative embodiments recognize and take into account that the display of video on a display device may not provide a desired perspective for the pilot. Further, the display device provides a fixed field of view that may not provide as much information as desired to the pilot.

Thus, the illustrative embodiments provide a method and apparatus for displaying an external view of a vehicle such as an aircraft. A position of a mobile display device relative to an exterior of the vehicle is identified. Image data from a sensor system for the vehicle that corresponds to a field of view of the mobile display device from the position of the mobile display device is identified. An external view from the vehicle is displayed on the mobile display device using the image data.

In this manner, image data such as a video feed from a camera may be displayed from the mobile display device. As the position of the mobile display device changes, video feeds from other cameras may be displayed on the mobile display device. In other words, the mobile display device may provide a view as if the mobile display device were a window from the interior of the vehicle to the exterior of the vehicle.

Figure 1:
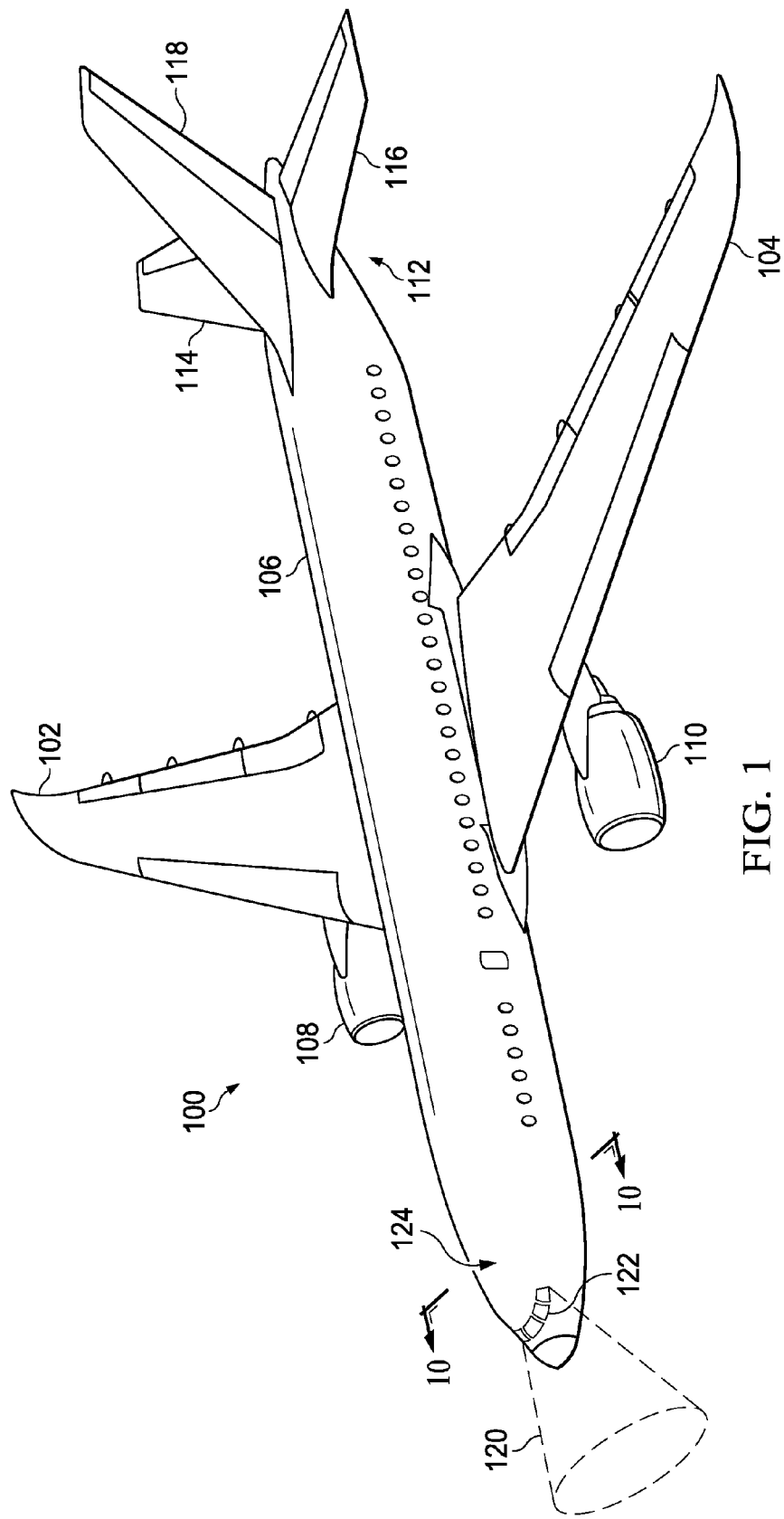
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which a display system may be implemented in accordance with an illustrative embodiment. In these illustrative examples, aircraft 100 has field of view 120 from windows 122 for flight deck 124 of aircraft 100.

A display system may be used to extend field of view 120 for a pilot in flight deck 124. The display system may provide a larger field of view without relying on adding additional windows for flight deck 124.

With the extended field of view, other portions of the environment outside of flight deck 124 may be seen by the pilot. For example, the pilot may be able to view wing 102, engine 110, vertical stabilizer 118, and other portions of aircraft 100. Additionally, the pilot also may be able to see objects such as operators on the ground, ground vehicles, buildings, and other structures around aircraft 100.

Turning now to FIG. 2, an illustration of a block diagram of a display environment is depicted in accordance with an illustrative embodiment. In this illustrative example, display environment 200 includes vehicle 202. Vehicle 202 may be aircraft 100 in FIG. 1. As depicted, vehicle display system 204 may be used with vehicle 202 to increase how much of external environment 206 around vehicle 202 may be seen by operator 208 of vehicle 202.

In these illustrative examples, vehicle display system 204 includes view generator 210, mobile display device 212, and sensor system 214. View generator 210 may be implemented in software, hardware, or a combination of the two. When software is used, the operations performed by view generator 210 may be implemented in the program code configured to be run on a processor unit. When hardware is employed, the hardware may include circuits that operate to perform the operations in view generator 210.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In this illustrative example, view generator 210 may be implemented in computer system 216. Computer system 216 is comprised of one or more computers. When more than one computer is present, those computers may be in communication with each other through a communications medium such as a network.

Mobile display device 212 is a hardware device and may include software that runs on mobile display device 212. For example, the software may include viewing application 217. In these illustrative examples, mobile display device 212 may be, for example, selected from one of a hand-held mobile display device, a mobile phone, a tablet computer, a laptop computer, a liquid crystal display, an organic light emitting display, and other suitable devices configured to display information.

Sensor system 214 is a hardware system that may include software. Sensor system 214 is configured to generate sensor data 218 about external environment 206 around vehicle 202. Sensor data 218 may include image data 220. Image data 220 may be images of external environment 206 around vehicle 202.

As depicted, sensor system 214 may be associated with vehicle 202, number of objects 238, or both vehicle 202 and number of objects 238. Number of objects 238 is one or more objects in external environment 206 around vehicle 202. In these illustrative examples, an object in number of objects 238 may be, for example, without limitation, a human operator, a truck, a cargo carrier, an airport ground support vehicle, an airport building, a gate, a barrier, a fence, a tower, or some other suitable object.

In this illustrative example, view generator 210 is configured to identify position 222 of mobile display device 212. Position 222 is relative to exterior 224 of vehicle 202. In this illustrative example, position 222 may include a location of mobile display device 212 in three-dimensional space and an orientation of mobile display device 212.

In this illustrative example, viewing application 217 may send position 222 from mobile display device 212 to view generator 210. Based on position 222 of mobile display device 212, view generator 210 is configured to identify image data 220 for vehicle 202 that corresponds to field of view 226 for mobile display device 212 from position 222 of mobile display device 212 relative to vehicle 202. View generator 210 is configured to display external view 228 for vehicle 202 on mobile display device 212 using image data 220.

In this illustrative example, view generator 210 may display external view 228 for vehicle 202 on mobile display device 212 by sending image data stream 229 to mobile display device 212. When mobile display device 212 receives image data stream 229, viewing application 217 displays external view 228 for vehicle 202 on mobile display device 212 using image data stream 229.

In other words, mobile display device 212 may act as a virtual window when mobile display device 212 is located in interior 230 of vehicle 202. Mobile display device 212 also may act as a virtual window through vehicle 202 when mobile display device 212 is located on a side of vehicle 202 outside of vehicle 202.

When position 222 of mobile display device 212 changes, external view 228 displayed on mobile display device 212 is changed to display current external view 232 for vehicle 202 from field of view 226 of mobile display device 212 to reflect the change in position 222 of mobile display device 212.

When position 222 of mobile display device 212 changes, field of view 226 for mobile display device 212 may change. As a result, image data 220 corresponding to field of view 226 also may change such that image data 220 corresponds to the change in field of view 226. In other words, image data 220 may be selected from different sensors 234 within sensor system 214. In the illustrative examples, other types of sensor data 218 may be used in addition to or in place of image data 220 in sensor data 218 to generate image data stream 229. In other words, sensor data 218 may be "fused" such that image data stream 229 includes information generated from multiple sensors of the same type, different type, or of both the same type and different type from sensors 234 in sensor system 214.

Additionally, view generator 210 also may receive sensor data 218 from sensor system 214. Sensor data 218 may include different data from image data 220. Sensor data 218 may be used to identify information 236 about external view 228 of vehicle 202. Information 236 may be information about at least one of vehicle 202 or number of objects 238 in external environment 206 around vehicle 202. In these illustrative examples, information 236 may be selected from at least one of a graphical indicator, a text, a video, a sound, an instruction, a caution, a guide, environmental information, an object identifier, and/or other types of information.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Information 236 may be presented along with external view 228 displayed on mobile display device 212. The presentation of information 236 may be made audibly, visually, tactilely, or some combination thereof. Information 236 is used to provide augmented reality 240 to operator 208 in these illustrative examples. In other words, a view of external environment 206 may be provided in which elements in external environment 206 are augmented by additional output such as sound, video, graphical indicators, text, and other types of output.

In this manner, vehicle display system 204 may be used by operator 208 to obtain more information about external environment 206 than currently possible through using windows or other types of portals in vehicle 202. Further, with the different illustrative embodiments, vehicle display system 204 also may provide augmented reality 240 to operator 208. With augmented reality 240, information such as information 236 may be presented along with image data 220 to provide better situational awareness of external environment 206 around vehicle 202.

Turning now to FIG. 3, an illustration of a block diagram of a sensor system is depicted in accordance with an illustrative embodiment. In this figure, examples of components used in sensor system 214 in FIG. 2 are illustrated.

As depicted, sensor system 214 includes at least one of visible light camera 300, infrared camera 302, ultrasonic sensor 304, ice detector 306, global positioning system 308, and other suitable components. One or more of these components may be associated with vehicle 202. In still other illustrative examples, one or more of these components may be associated with number of objects 238. In other words, sensor system 214 may not be located only on vehicle 202.

When one component is "associated" with another component, the association is a physical association in the depicted examples. For example, a first component, sensor system 214, may be considered to be associated with a second component, vehicle 202, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Visible light camera 300 may generate image data 220. In these illustrative examples, image data 220 may be individual images, a video data stream, or some combination thereof. Image data 220 may be, for example, images of external environment 206 around vehicle 202. In other illustrative examples, image data 220 may include images for vehicle 202.

Visible light camera 300 may include various optics and may provide a level of resolution that allows for zooming in on various objects that provide a desired level of detail. This desired level of detail may be provided without having to change the position of visible light camera 300. In other illustrative examples, the optics may include a zoom lens for changing the level of optical detail.

Infrared camera 302 also may generate image data 220. Image data 220 may include images of external environment 206, vehicle 202, or some combination thereof. Further, image data 220 also may be used to identify information about vehicle 202, number of objects 238 in external environment 206, or a combination thereof. This information may include, for example, temperatures of vehicle 202, number of objects 238, or some combination thereof. This temperature may be used to generate information 236 for augmented reality 240. This combination of data is another example of how information may be combined or "fused" in image data stream 229 to provide external view 228 on mobile display device 212 in FIG. 2.

Ultrasonic sensor 304 may provide sensor data 218. For example, ultrasonic sensor 304 may indicate a presence of an object in number of objects 238, a distance to an object in number of objects 238, or both. The presence of number of objects 238 and the distance to number of objects 238 may be used to generate information 236 for augmented reality 240.

Ice detector 306 may generate information about a presence of ice on exterior 224 of vehicle 202. Whether ice is present on exterior 224 may be used to generate information 236 for augmented reality 240.

Global positioning system 308 generates information about the position of objects such as mobile display device 212, sensor system 214, number of objects 238, or some combination thereof. The position of mobile display device 212 as well as the position of sensor system 214 may be used to identify field of view 226 for mobile display device 212. The position of number of objects 238 may be used to form information 236 for augmented reality 240. The position of sensor system 214 may aid in identifying what the image should look like when displayed on mobile display device 212.

The illustrations of sensors that may be used in sensor system 214 in FIG. 3 are only meant as examples. These examples are not intended to limit the types of number of sensors that may be used to implement sensors 234 in sensor system 214 in FIG. 2. For example, other types of sensors may be used in addition to or in place of the ones illustrated in FIG. 3. Some other non-limiting examples include a laser radar system, an inertial measurement unit, a radio frequency sensor, an optical sensor, and other suitable types of sensors.

With reference now to FIG. 4, an illustration of a data packet is depicted in accordance with an illustrative embodiment. Data packet 400 is an example of a data packet that may be in image data 220 in FIG. 2.

As depicted, data packet 400 includes image data 402, position 404, distance data 406, field of view 408, installed optics 410, unique equipment identifier 412, and other suitable types of information. Image data 402 is one or more images generated by a camera. This image data may be for visible or non-visible light detected by the camera.

Position 404 is the position of the camera generating data packet 400. In this illustrative example, position 404 may include a location in three-dimensions and an orientation of the camera. Distance data 406 may indicate a distance to one or more objects in image data 402. Distance data 406 also may indicate a range of distances, such as a grid, within the field of view of the camera. This object may be, for example, without limitation, an aircraft, a building, a human operator, a ground vehicle, and other suitable objects.

Field of view 408 indicates a field of view of the camera. Installed optics 410 may indicate different capabilities for the camera. For example, installed optics 410 may indicate whether a zoom lens is present in the camera. Unique equipment identifier 412 is a unique identifier for the camera.

The illustration of vehicle display system 204 in FIG. 2 and the different components in FIG. 3 and FIG. 4 are not meant to imply limitations to the manner in which an illustrative embodiment may be implemented.

Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the illustrative examples are described with respect to an aircraft, an illustrative embodiment may be applied to other vehicles other than aircraft. These other vehicles may include, for example, without limitation, a submarine, a personnel carrier, a tank, a train, an automobile, a bus, a spacecraft, a surface ship, and other suitable vehicles.

In still another illustrative example, view generator 210 may be configured to identify position 222 of mobile display device 212 relative to an exterior of a location in vehicle 202. This location exterior to the location in vehicle 202 may be another location inside of vehicle 202 not visible to operator 208 from the location inside of vehicle 202. For example, the location of operator 208 may be the flight deck of an aircraft. The other location may be, for example, a passenger cabin, a cargo area, or some other location within the aircraft.

Figure 5:
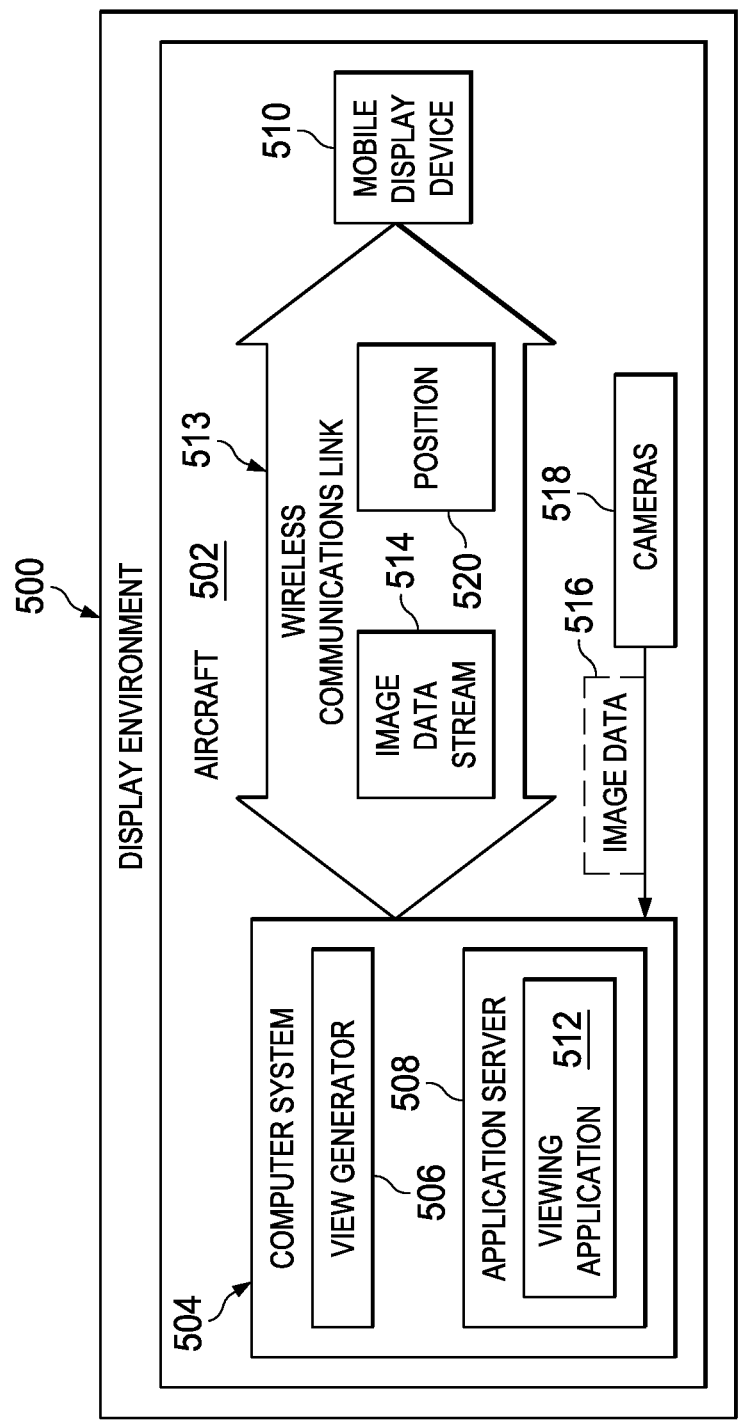
FIG. 5 is an illustration of a block diagram of a display environment in accordance with an illustrative embodiment.

Turning now to FIG. 5, an illustration of a block diagram of a display environment is depicted in accordance with an illustrative embodiment. In this depicted example, an example of an implementation of display environment 200 in FIG. 2 is shown. As depicted, display environment 500 may be implemented in aircraft 502.

In this depicted example, computer system 504 is located in aircraft 502. Computer system 504 includes view generator 506 and application server 508. Computer system 504 also may include other hardware or software components used to operate aircraft 502.

In this illustrative example, mobile display device 510 may download viewing application 512 from application server 508 over wireless communications link 513.

Viewing application 512 is software configured to display external views for aircraft 502 using image data stream 514 generated by view generator 506. Viewing application 512 may be sent by application server 508 to mobile display device 510 for use in displaying image data stream 514 on mobile display device 510. In these illustrative examples, view generator 506 receives image data 516 from cameras 518 on aircraft 502.

View generator 506 generates image data stream 514 based on position 520 received for mobile display device 510 over wireless communications link 513. In these illustrative examples, image data stream 514 is sent to mobile display device 510 over wireless communications link 513.

Figure 6:
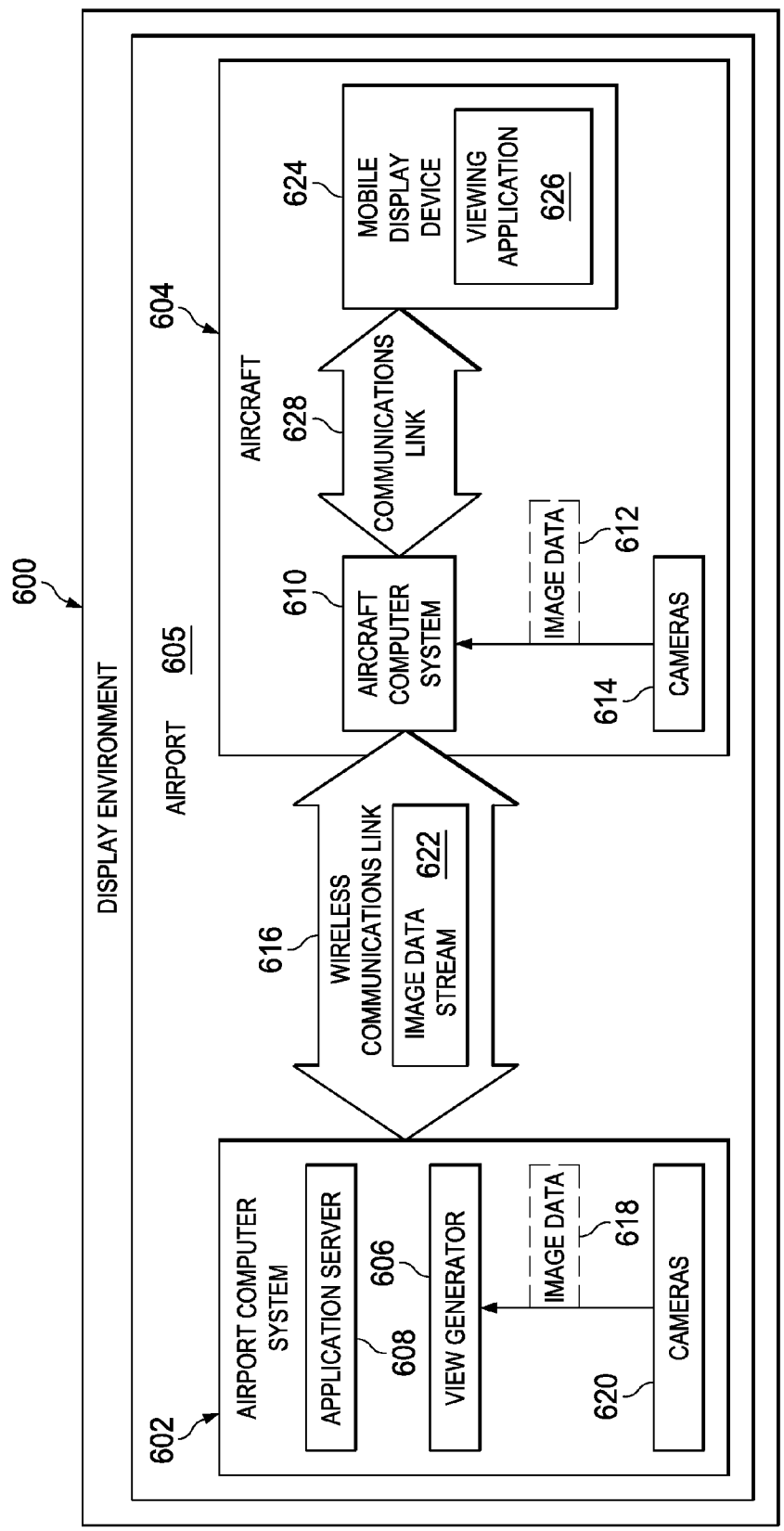
FIG. 6 is an illustration of a block diagram of a display environment in accordance with an illustrative embodiment.

Turning now to FIG. 6, an illustration of a block diagram of a display environment is depicted in accordance with an illustrative embodiment. In this depicted example, an example of an implementation of display environment 200 in FIG. 2 is shown.

In this illustrative example, display environment 600 includes airport computer system 602 and aircraft 604 at airport 605. View generator 606 and application server 608 are located in airport computer system 602.

As depicted, view generator 606 is located in airport computer system 602 rather than aircraft computer system 610 in this illustrative example. With this implementation, viewing the external environment around aircraft 604 occurs when aircraft 604 is on the ground at airport 605. In this manner, less computing resources may be needed from aircraft computer system 610.

As depicted, aircraft computer system 610 receives image data 612 from cameras 614 on aircraft 604. Image data 612 may be sent to view generator 606 in airport computer system 602 over wireless communications link 616.

Additionally, view generator 606 also may receive image data 618 from cameras 620. Cameras 620 may be located on different objects or structures such as ground vehicles, a terminal, a tower, or other suitable structures.

In these illustrative examples, view generator 606 generates image data stream 622 and sends image data stream 622 to mobile display device 624 in aircraft 604 over wireless communications link 616. In this illustrative example, image data stream 622 may be displayed on mobile display device 624 using viewing application 626. Viewing application 626 may be downloaded from application server 608 in airport computer system 602. In this illustrative example, viewing application 626 may communicate with aircraft computer system 610 using communications link 628.

The illustration of example implementations for a display environment in FIG. 5 and FIG. 6 is not meant to imply limitations to the manner in which other illustrative embodiments may be implemented. For example, in some illustrative examples, cameras may be present only at airport 605 and not on aircraft 604. In this manner, existing aircraft that do not have cameras may still obtain external views on the aircraft without needing upgrades or refurbishing.

In still other illustrative examples, an application server may not be necessary. Instead, the viewing application may be preloaded onto a mobile display device. In another illustrative example, the different communications links may be secured through encryption or other mechanisms. In this manner, access to information sent across communications links may be restricted to those devices authorized to have access to the information.

Figure 7:
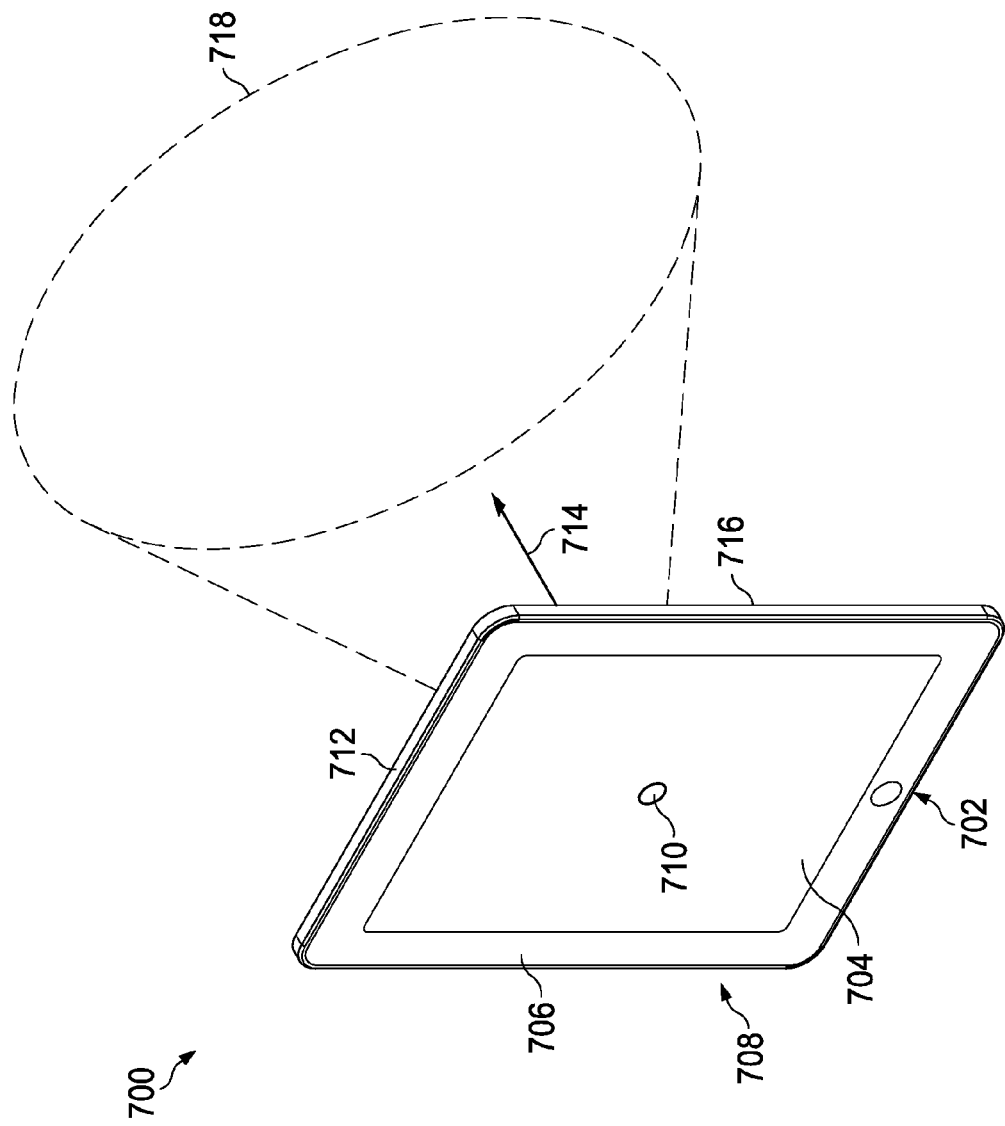
FIG. 7 is an illustration of positioning of a mobile display device in accordance with an illustrative embodiment.

Turning now to FIG. 7, an illustration of positioning of a mobile display device is depicted in accordance with an illustrative embodiment. Mobile display device 700 is an example of a physical implementation for mobile display device 212 shown in block form in FIG. 2.

Mobile display device 700 takes the form of tablet computer 702 having display 704 on side 706 of tablet computer 702. Position 708 of tablet computer 702 may be identified using a global positioning system and an accelerometer system within tablet computer 702. The global positioning system may provide location 710 of tablet computer 702 in three-dimensional space. The accelerometer system may identify orientation 712 of tablet computer 702. In these illustrative examples, orientation 712 may be direction 714 in which side 716 of tablet computer 702 faces.

In this illustrative example, tablet computer 702 has field of view 718. Field of view 718 is based on orientation 712 in this illustrative example. Field of view 718 may be based on the size of display 704 or may be selected arbitrarily depending on the particular implementation.

In these illustrative examples, tablet computer 702 may be located within the interior of aircraft 100 in FIG. 1, such as in flight deck 124. In other illustrative examples, tablet computer 702 may be located on a side of aircraft 100. In this manner, tablet computer 702 may provide a view of external environment 206 from flight deck 124 inside of aircraft 100.

For example, tablet computer 702 may be located on a side of aircraft 100 while an operator performs inspections. When located on a side of aircraft 100, tablet computer 702 may display views of external environment 206 on the other side of aircraft 100. In other words, tablet computer 702 may provide a virtual window through aircraft 100.

Figure 8:
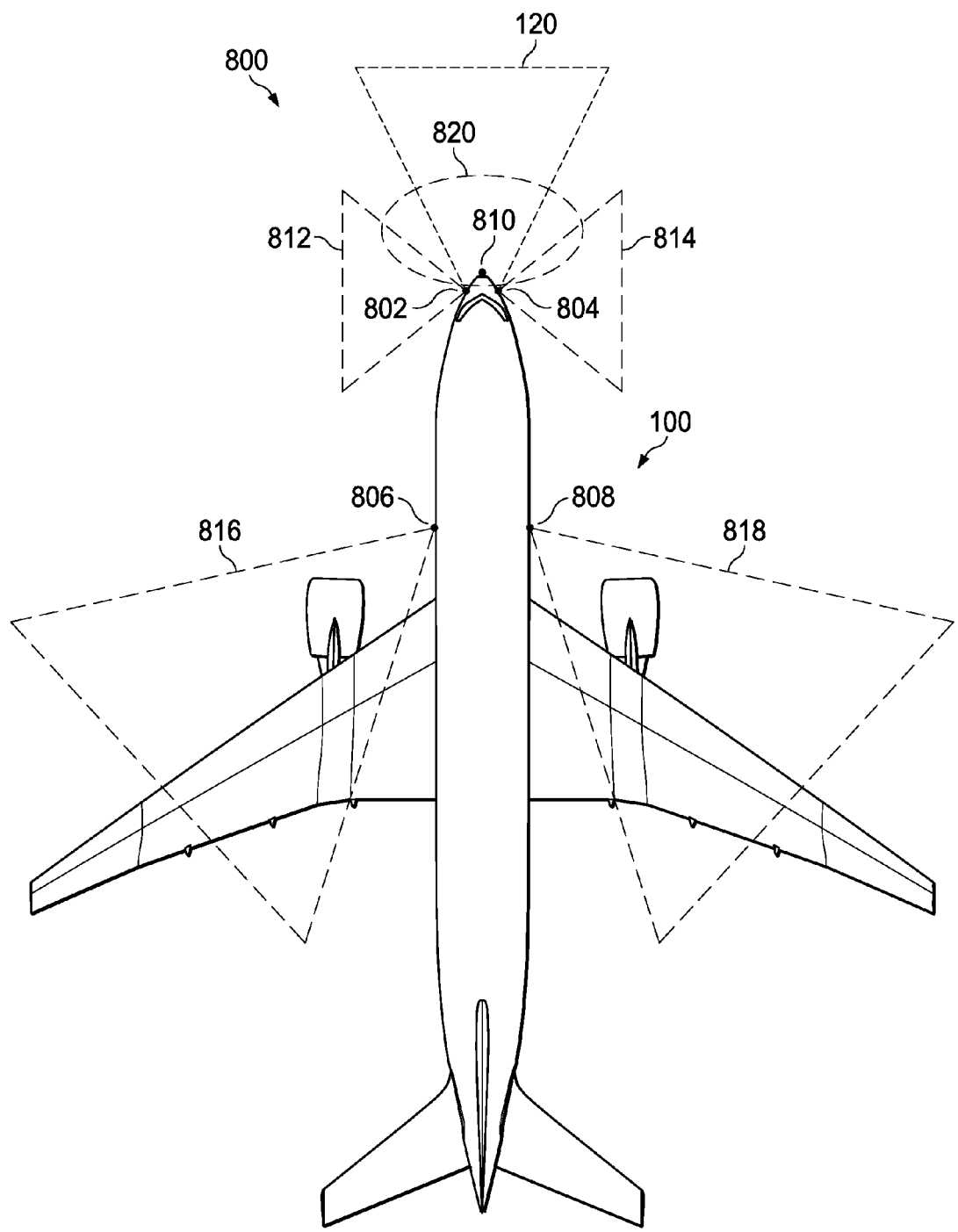
FIG. 8 is an illustration of a sensor system associated with an aircraft in accordance with an illustrative embodiment.

Turning now to FIG. 8, an illustration of a sensor system associated with an aircraft is depicted in accordance with an illustrative embodiment. In this illustrative example, a top view of aircraft 100 with sensor system 800 is shown.

In particular, sensor system 800 includes cameras 802, 804, 806, 808 and 810. Camera 802 has field of view 812, camera 804 has field of view 814, camera 806 has field of view 816, camera 808 has field of view 818, and camera 810 has field of view 820.

Figure 9:
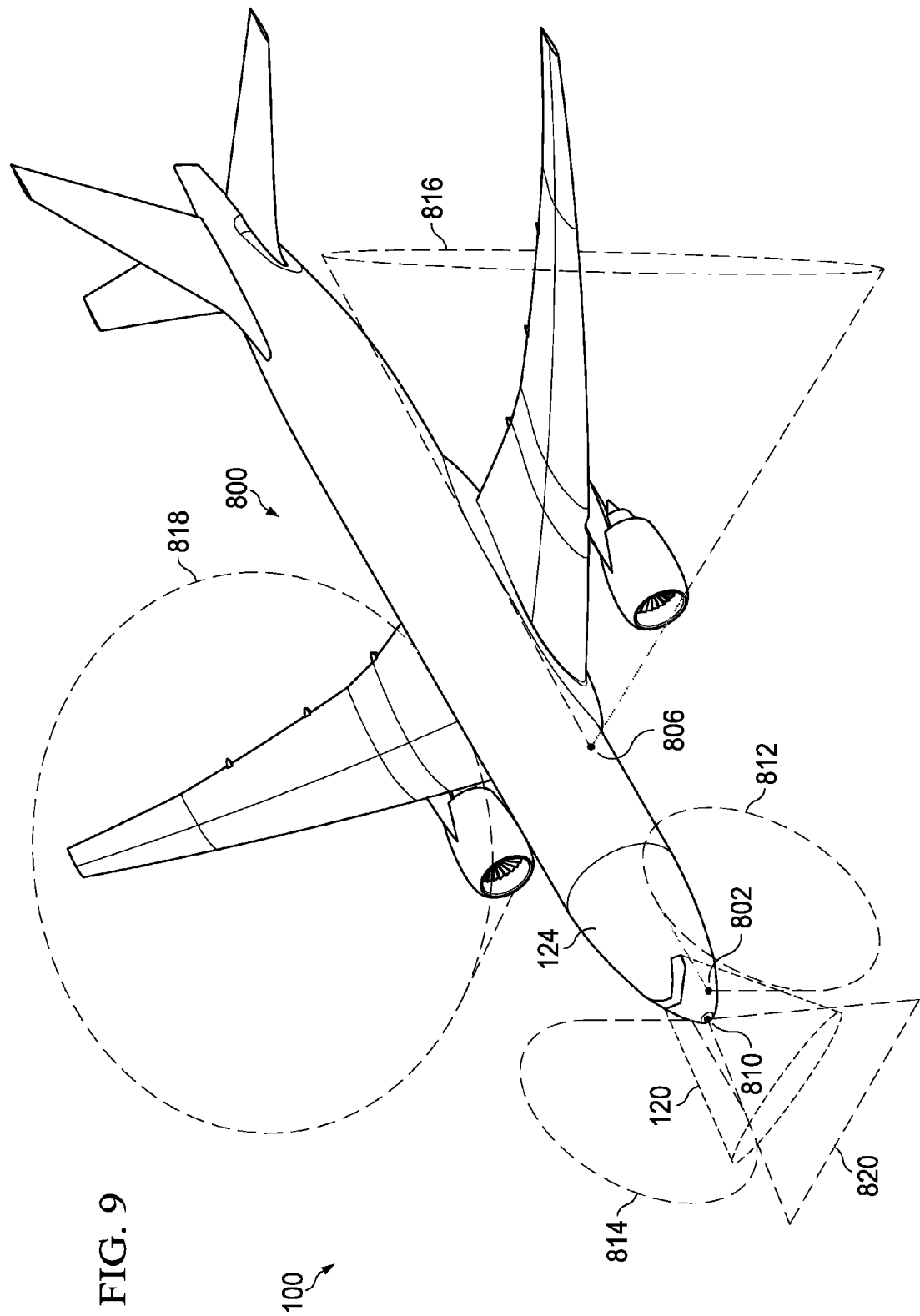
FIG. 9 is an illustration of a sensor system associated with an aircraft in accordance with an illustrative embodiment.

In FIG. 9, an illustration of a sensor system associated with an aircraft is depicted in accordance with an illustrative embodiment. A perspective view of aircraft 100 is shown in this figure with field of views 812, 814, 816, 818, and 820 generated by sensor system 800.

Each of the cameras associated with the field of views may generate video data of the exterior environment around aircraft 100. This video data may be used to increase the field of view visible to an operator located within flight deck 124 of aircraft 100 beyond field of view 120.

Figure 10:
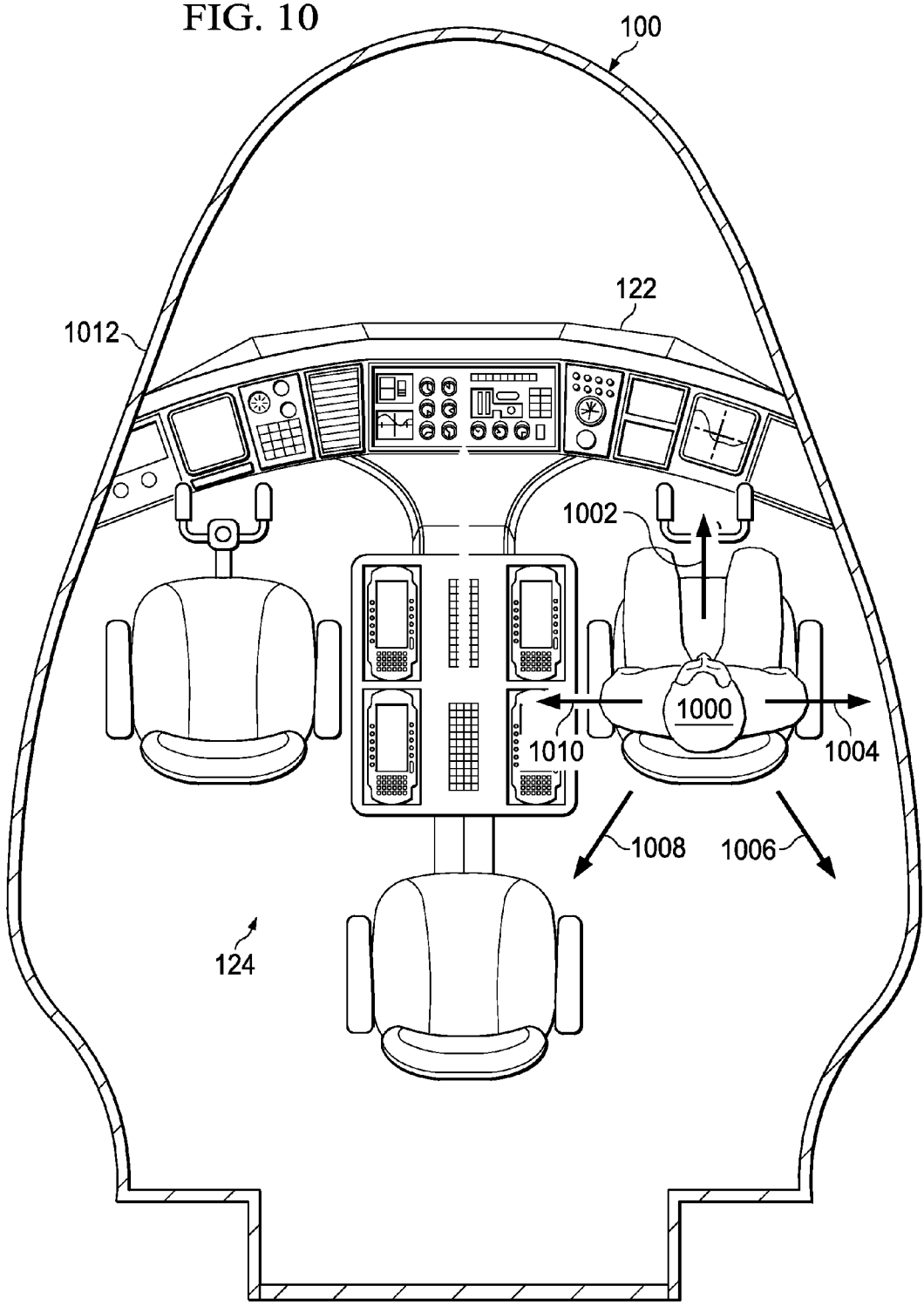
FIG. 10 is an illustration of a flight deck in an aircraft in accordance with an illustrative embodiment.

Turning now to FIG. 10, an illustration of a flight deck in an aircraft is depicted in accordance with an illustrative embodiment. In this illustrative example, a cross-sectional view of flight deck 124 is seen taken along lines 10-10 in FIG. 1.

In this illustrative example, operator 1000 may look in various directions such as directions 1002, 1004, 1006, 1008, and 1010. When operator 1000 looks in direction 1002, operator 1000 may see the external environment outside of aircraft 100 through windows 122. However, when operator 1000 looks in directions 1004, 1006, 1008, and 1010, the operator does not see the external environment outside of aircraft 100. Aircraft structures 1012 inside flight deck 124 prevent operator 1000 from seeing the external environment outside of aircraft 100.

Views of the external environment outside of aircraft 100 in directions 1004, 1006, 1008, and 1010 may be provided through mobile display device 700 in FIG. 7. Mobile display device 700 in FIG. 7 may display external views of the external environment around aircraft 100 in these directions.

Figure 11:
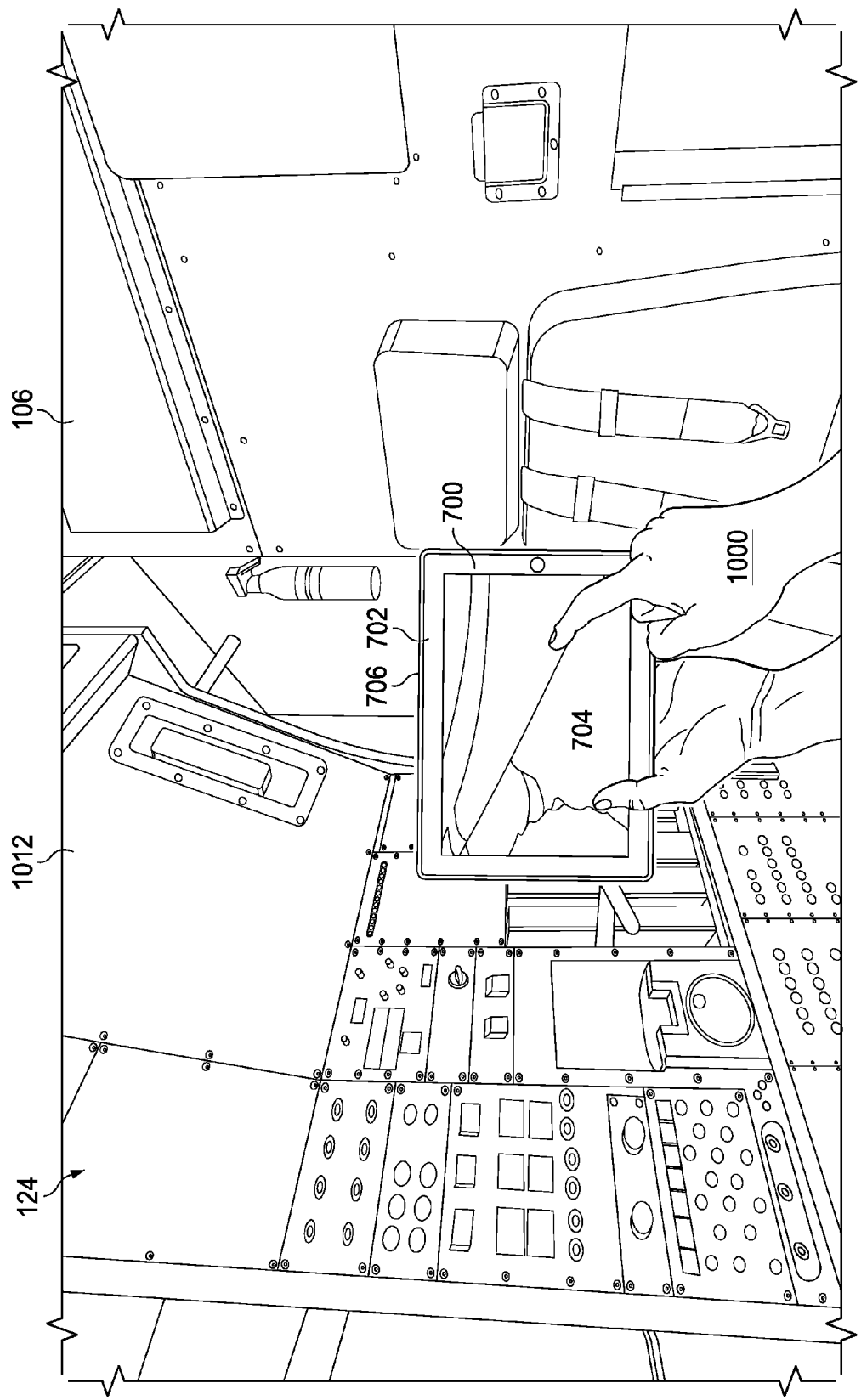
FIG. 11 is an illustration of a view within a flight deck in accordance with an illustrative embodiment.

Turning now to FIG. 11, an illustration of a view within a flight deck is depicted in accordance with an illustrative embodiment. In this illustrative example, a view of flight deck 124 is shown in direction 1006. As can be seen in this view, aircraft structures 1012 block a view of the external environment around aircraft 100 in direction 1006.

In this illustrative example, mobile display device 700 is pointed in direction 1006. Display 704 on mobile display device 700 displays image data from sensor system 800 to display an external view for aircraft 100. Mobile display device 700 provides a virtual window to operator 1000. As mobile display device 700 is moved to different directions, the external view displayed on display 704 of mobile display device also may change to correspond to the external view that would be seen from the aircraft if a window was present.

Figure 12:
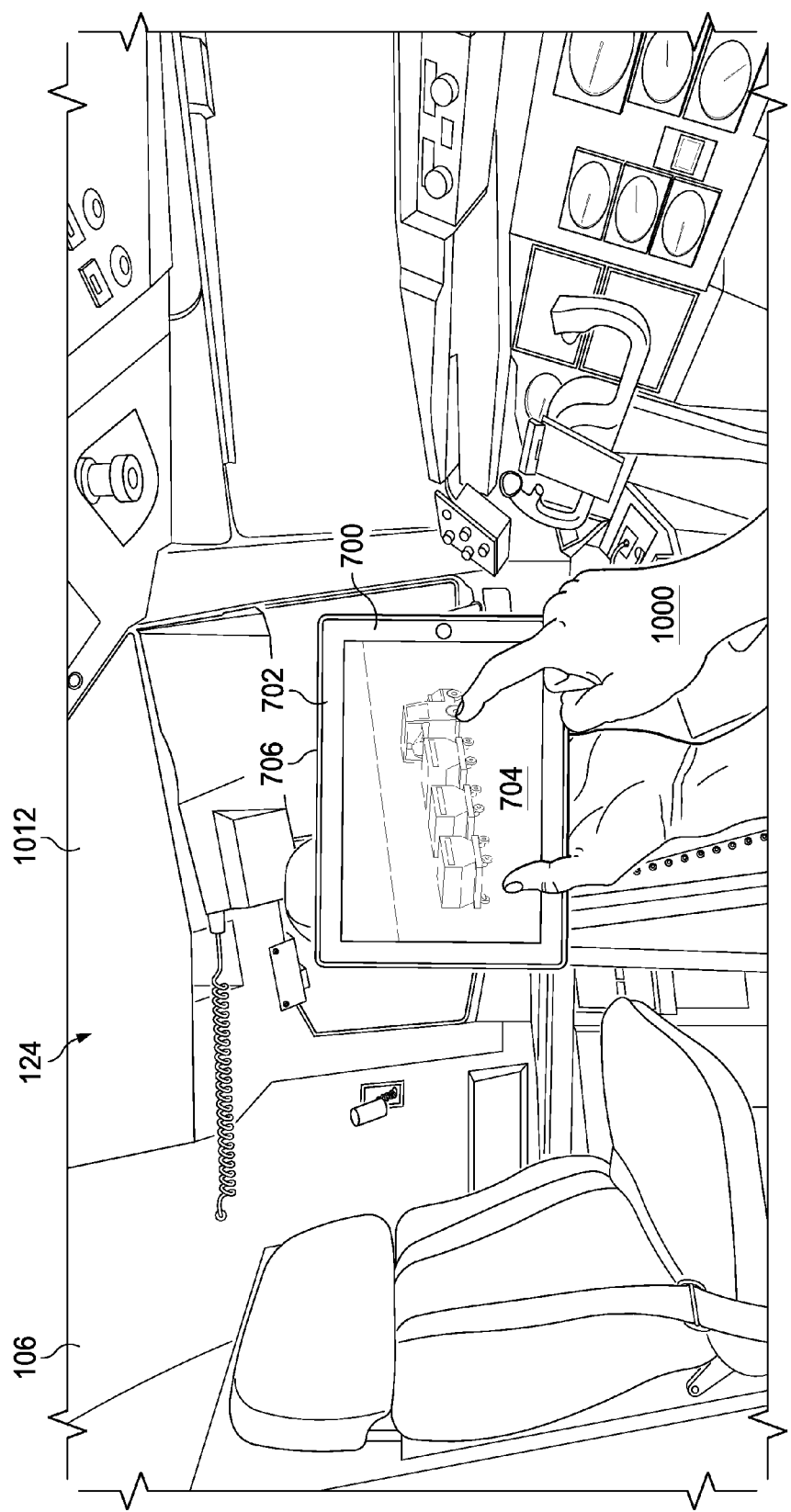
FIG. 12 is an illustration of a view within a flight deck in accordance with an illustrative embodiment.

Turning now to FIG. 12, an illustration of a view within a flight deck is depicted in accordance with an illustrative embodiment. In this depicted example, a view from direction 1010 is shown. In this view, aircraft structures 1012 block the view of the external environment around aircraft 100 in direction 1010.

Mobile display device 700 is pointed in direction 1010. With mobile display device 700 pointed in this direction, the external view for aircraft 100 in direction 1010 may be seen on display 704.

Figure 13:
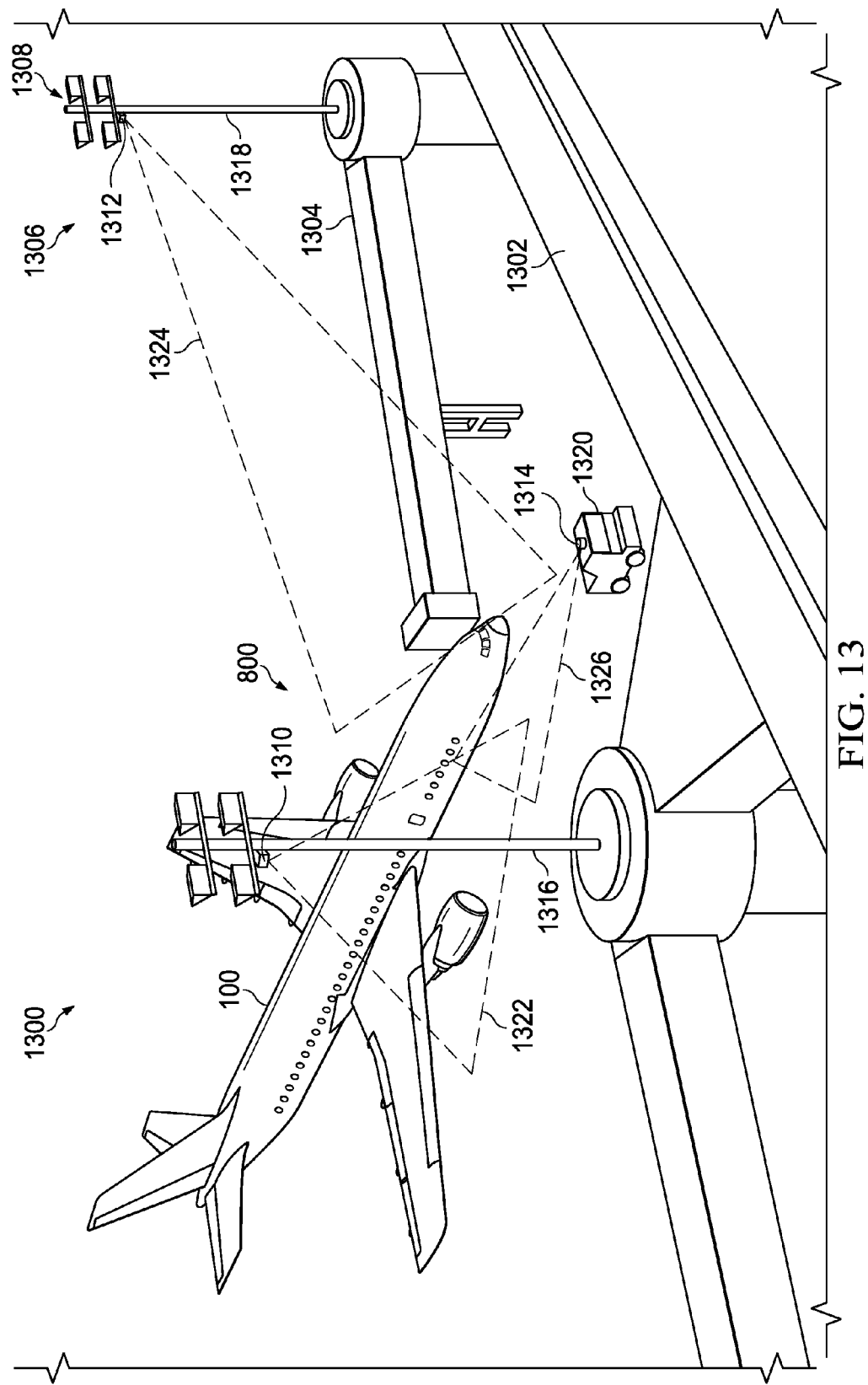
FIG. 13 is an illustration of a display environment in accordance with an illustrative embodiment.

Turning now to FIG. 13, an illustration of a display environment is depicted in accordance with an illustrative embodiment. Display environment 1300 is an example of a physical implementation for display environment 200 in FIG. 2. In this illustrative example, aircraft 100 is located at terminal 1302. In particular, aircraft 100 is located at gate 1304 at terminal 1302.

In this illustrative example, sensor system 1306 includes sensor system 800 associated with aircraft 100. Additionally, sensor system 1306 also includes sensor system 1308 associated with a number of objects at terminal 1302. In this illustrative example, sensor system 1308 also includes camera 1310, camera 1312, and camera 1314. Camera 1310 is associated with light pole 1316, camera 1312 is associated with light pole 1318, and camera 1314 is associated with ground service vehicle 1320.

Camera 1310 provides field of view 1322, camera 1312 provides field of view 1324, and camera 1314 provides field of view 1326. These cameras provide additional image data that may be used to display the external environment around aircraft 100. In other words, display 704 on mobile display device 700 may display views based on image data from at least one of sensor system 800 and sensor system 1308 in sensor system 1306.

The illustration of FIGS. 7-13 are not meant to limit the manner in which different illustrative embodiments may be implemented. The examples illustrated in these figures are provided as examples of physical implementations for components in vehicle display system 204 in FIG. 2.

For example, other numbers of cameras may be present on aircraft 100. For example, seven cameras, ten cameras, or some other number of cameras may be associated with aircraft 100. In still other illustrative examples, mobile display device 700 may be used outside of aircraft 100. For example, operator 1000 may perform visual inspections outside of aircraft 100. Mobile display device 700 may be used to provide a view through aircraft 100. For example, operator 1000 may be on one side of aircraft 100 and may use mobile display device 700 to see the external view on the other side of aircraft 100 while performing inspections or other operations.

Figure 14:
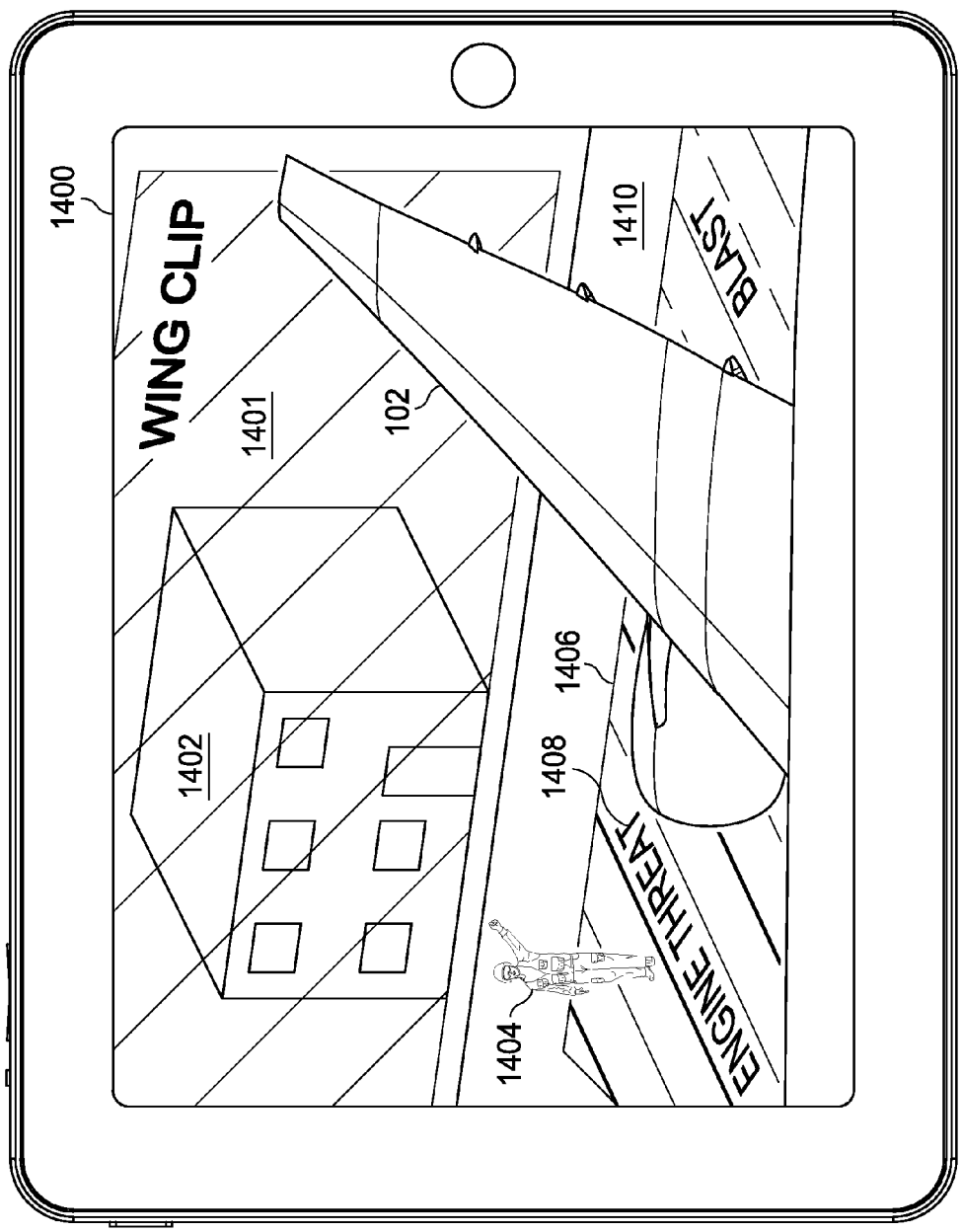
FIG. 14 is an illustration of an external view displayed on a mobile display device in accordance with an illustrative embodiment.

Turning now to FIG. 14, an illustration of an external view displayed on a mobile display device is depicted in accordance with an illustrative embodiment. In this illustrative example, display 1400 is an example of display 704 on mobile display device 700 in FIG. 7.

As depicted, external view 1401 displayed on display 1400 is generated using image data from one or more cameras associated with aircraft 100 or from cameras associated with other objects in the environment around aircraft 100. External view 1401 is based on a position of mobile display device 700 within aircraft 100 in this illustrative example.

In this illustrative example, wing 102 of aircraft 100 is seen in the external view on display 1400. Additionally, a number of objects such as airport building 1402 and operator 1404 also are shown in this view displayed on mobile display device 700.

Additionally, other information may be displayed in addition to wing 102, airport building 1402, and operator 1404. In this illustrative example, the display of the external view 1401 for aircraft 100 may be augmented with graphical indicator 1406 and text 1408. Graphical indicator 1406 identifies an area on ground 1410 in external view 1401. Additionally, text 1408 provides an alert about the area. In this illustrative example, the alert indicates an engine threat for objects that may be present in the area identified by graphical indicator 1406.

Figure 15:
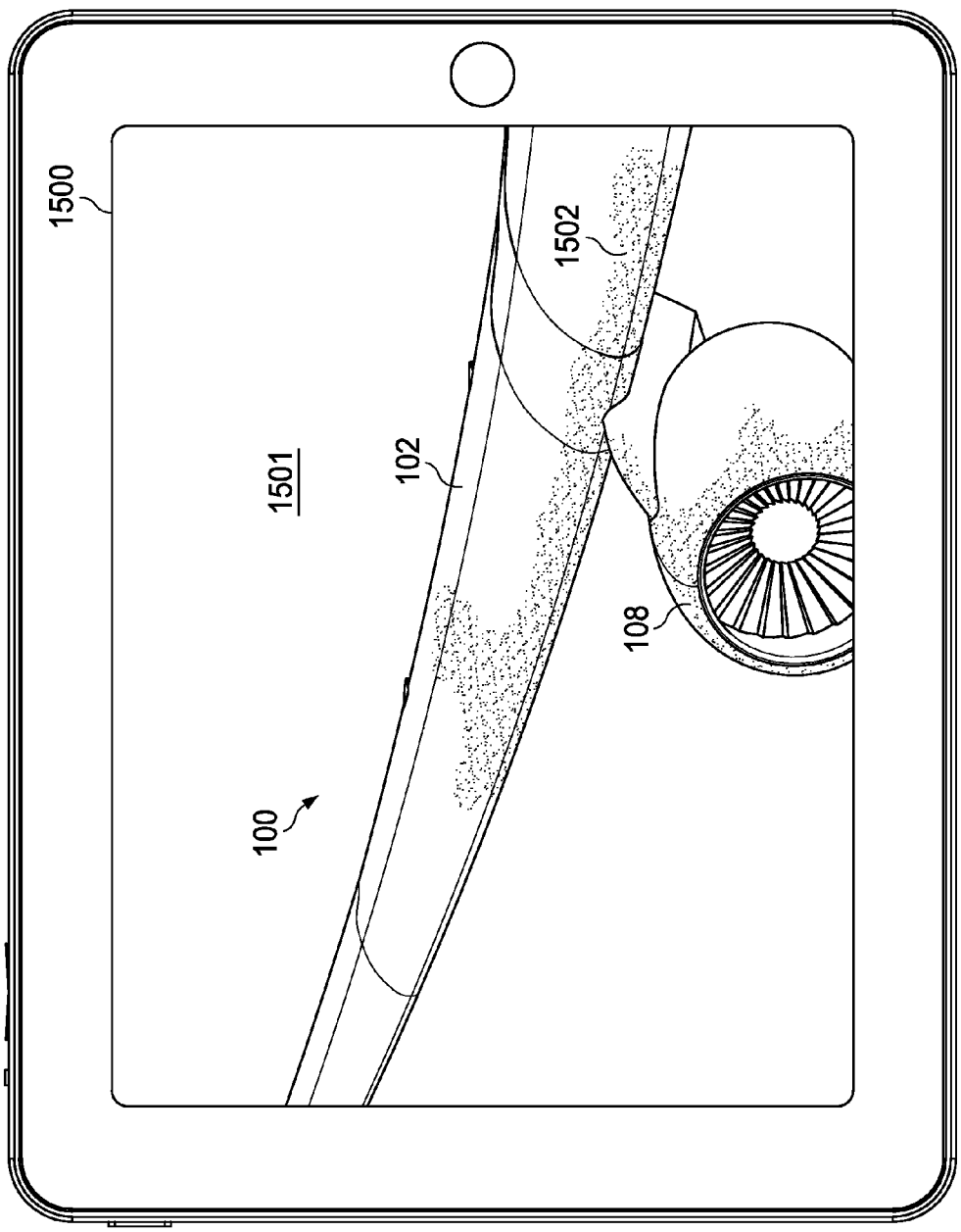
FIG. 15 is an illustration of an external view displayed on a mobile display device in accordance with an illustrative embodiment.

Turning next to FIG. 15, an illustration of an external view displayed on a mobile display device is depicted in accordance with an illustrative embodiment. In this illustrative example, display 1500 is an example of display 704 on mobile display device 700 in FIG. 7.

As depicted, external view 1501 displayed on display 1500 is generated using image data from one or more cameras associated with aircraft 100 or from cameras associated with other objects in the environment around aircraft 100. External view 1501 is based on a position of mobile display device 700 within aircraft 100 in this illustrative example.

In this illustrative example, wing 102 and engine 108 for aircraft 100 are seen in external view 1501 on display 1500. In this illustrative example, graphical indicator 1502 is displayed on portions of wing 102 and engine 108. This graphical indicator indicates a presence of ice on these aircraft structures. The identification of ice may be made through sensors in a sensor system for the aircraft such as an ice detector, a color filter configured to increase shadow visibility, or some other suitable type of sensor.

Figure 16:
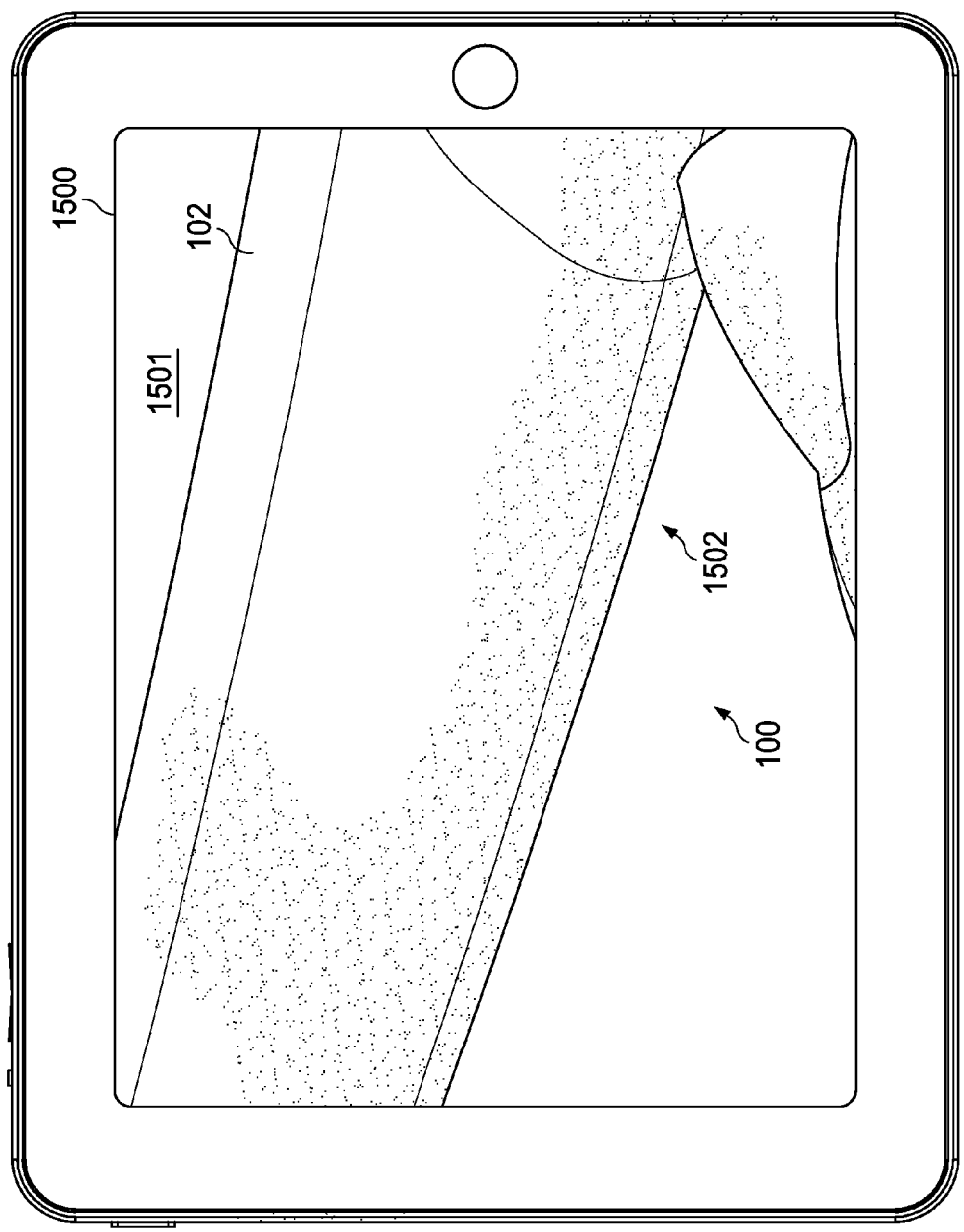
FIG. 16 is an illustration of an external view displayed on a mobile display device in accordance with an illustrative embodiment.

Turning now to FIG. 16, an illustration of an external view displayed on a mobile display device is depicted in accordance with an illustrative embodiment. In this illustrative example, a zoomed view of external view 1501 in FIG. 15 is shown. In this manner, an operator may see more detail of a particular portion of external view 1501. The selection of the portion may be based on the operator seeing graphical indicator 1502. In this manner, the operator may make an additional inspection of wing 102.

The illustration of external views and information augmented in the external views in FIGS. 14-16 are only provided as some example implementations of information that may be displayed on a mobile display device. These examples are not meant to limit the manner in which other displays of external views may be implemented.

In other illustrative examples, the external view may be displayed from more than one view point depending on the particular implementation. For example, the external view displayed may be from a camera having a field of view corresponding to the field of view for the mobile display device. Another camera may provide image data for objects in the field of view for the mobile display device, but may be located from another view point. In other words, the objects in the field of view of the mobile display device may be displayed using image data from cameras that may show the same objects but from different viewpoints.

Thus, the image data from these two different cameras may provide image data that corresponds to a field of view of the mobile display device in these illustrative examples. In other words, the "virtual window" provided by the mobile display device may not correspond exactly to a window at that direction pointed to by the mobile display device.

However, the external view displayed includes image data to show the objects that would be seen from that direction.

In some illustrative examples, a modeling program may be used to generate three-dimensional information about different objects such as an aircraft, an airport, vehicles, and other suitable objects. The three-dimensional information may be used to include these objects in an image data stream displayed on a mobile display device when image data is not available for these objects from a sensor system. In this manner, a scene of objects in the field of view may be recreated more accurately than possible with just image data from cameras in the sensor system.

Figure 17:
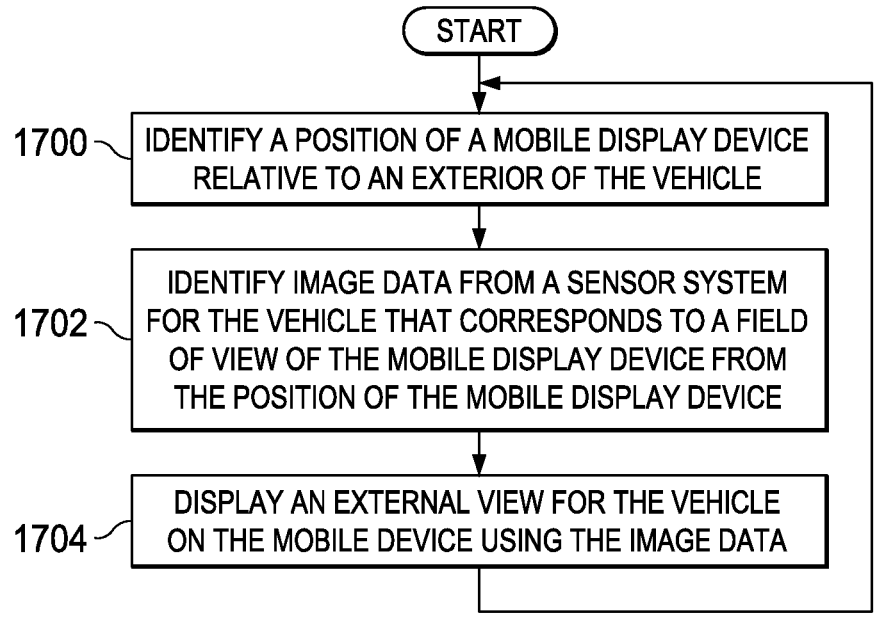
FIG. 17 is an illustration of a flowchart of a process for displaying an external view of a vehicle in accordance with an illustrative embodiment.

With reference now to FIG. 17, an illustration of a flowchart of a process for displaying an external view of a vehicle is depicted in accordance with an illustrative embodiment. This process may be implemented in display environment 200 in FIG. 2. In particular, this process may be implemented using view generator 210 in FIG. 2.

The process begins by identifying a position of a mobile display device relative to an exterior of the vehicle (operation 1700). The process then identifies image data from a sensor system for the vehicle that corresponds to a field of view of the mobile display device from the position of the mobile display device (operation 1702).

The process displays an external view for the vehicle on the mobile display device using the image data (operation 1704) with the process returning to operation 1700. The process may continue in this fashion until the view is no longer needed by the operator. In this illustrative example, the view generator may cause the display of the external view on the mobile display device by sending an image data stream of the external view to the mobile display device.

Figure 18:
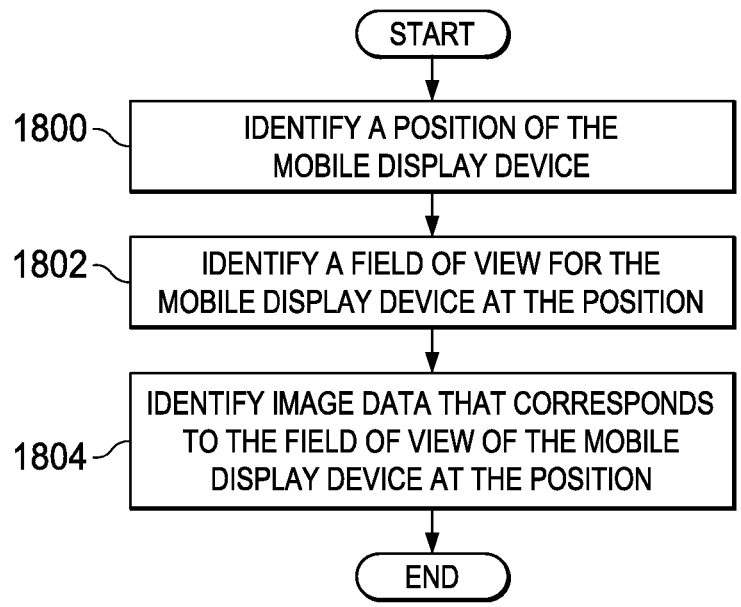
FIG. 18 is an illustration of a flowchart of a process for identifying image data for displaying an external view for a vehicle in accordance with an illustrative embodiment.

Turning now to FIG. 18, an illustration of a flowchart of a process for identifying image data for displaying an external view for a vehicle is depicted in accordance with an illustrative embodiment. This process is an example of an implementation for operation 1702 in FIG. 17.

The process begins by identifying a position of the mobile display device (operation 1800). Thereafter, the process identifies a field of view for the mobile display device at the position (operation 1802). This field of view identifies what objects may be seen based on the position of the mobile display device.

Thereafter, the process identifies image data that corresponds to the field of view of the mobile display device at the position (operation 1804), with the process terminating thereafter. In operation 1804, the image data may be image data generated by a camera having a field of view closest to the mobile display device. This identification may be made by identifying a camera with a position closest to the mobile display device.

In other illustrative examples, the correspondence to the field of view for the mobile display device may be made by identifying image data having substantially the same objects in the field of view of the mobile display device. In some illustrative examples, different structures in the flight deck may be used by the mobile display device to identify its orientation within the aircraft. For example, structures such as windows, a door, a display, and other structures may be used by the mobile display device to identify its position within the flight deck or other location within the aircraft.

Figure 19:
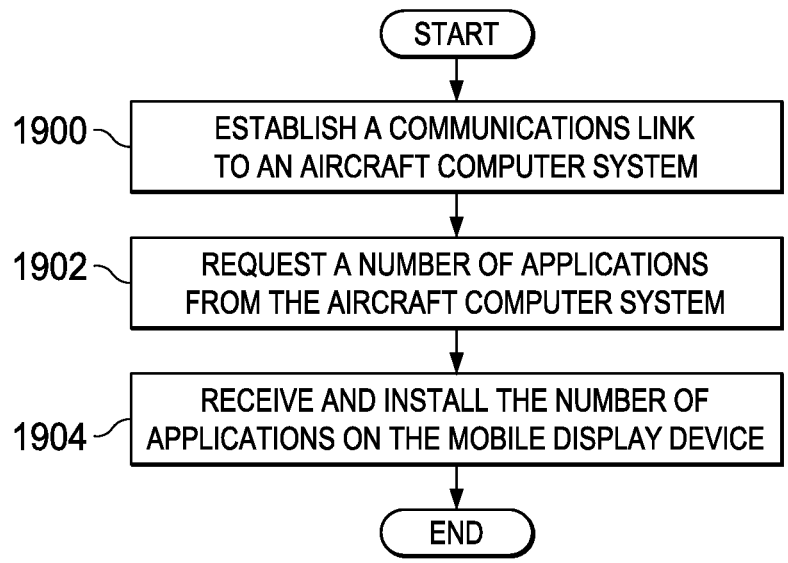
FIG. 19 is an illustration of a flowchart of a process for installing a viewing application to display an external view for a vehicle in accordance with an illustrative embodiment.

Turning now to FIG. 19, an illustration of a flowchart of a process for installing a viewing application to display an external view for a vehicle is depicted in accordance with an illustrative embodiment. The process illustrated in FIG. 19 may be implemented using mobile display device 212 in FIG. 2.

The process begins by establishing a communications link to an aircraft computer system (operation 1900). The process requests a number of applications from the aircraft computer system (operation 1902). In this illustrative example, the mobile display device may be a tablet computer on which an application may be loaded for use in performing operations to manage the vehicle or obtain information about the vehicle. In this illustrative example, one of the applications may include viewing application 217. The particular applications requested in operation 1902 may be based on user input from an operator or may be a pre-defined request.

The process receives and installs the number of applications on the mobile display device (operation 1904), with the process terminating thereafter.

Figure 20:
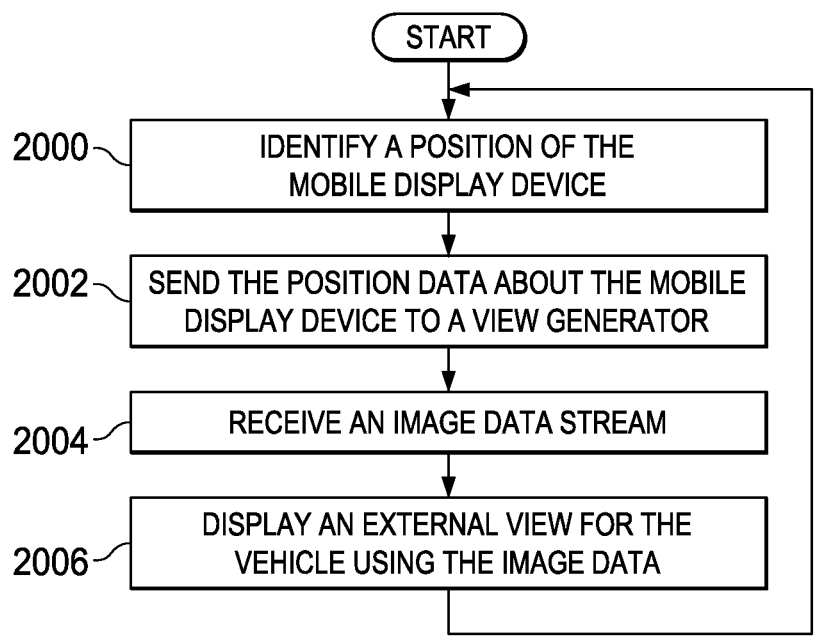
FIG. 20 is an illustration of a flowchart of a process for displaying an external view for a vehicle in accordance with an illustrative embodiment.

With reference now to FIG. 20, an illustration of a flowchart of a process for displaying an external view for a vehicle is depicted in accordance with an illustrative embodiment. The process illustrated in FIG. 20 may be implemented using mobile display device 212 in FIG. 2. In these illustrative examples, this process may be implemented in viewing application 217 in FIG. 2.

The process begins by identifying a position of the mobile display device (operation 2000). The position may include a three-dimensional location and an orientation of the mobile display device. The position data about the mobile display device is sent to a view generator (operation 2002).

Thereafter, an image data stream is received (operation 2004). This image data stream may include one or more images. The process displays an external view for the vehicle using the image data (operation 2006). The process then returns to operation 2000 until the viewing application is terminated.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 21:
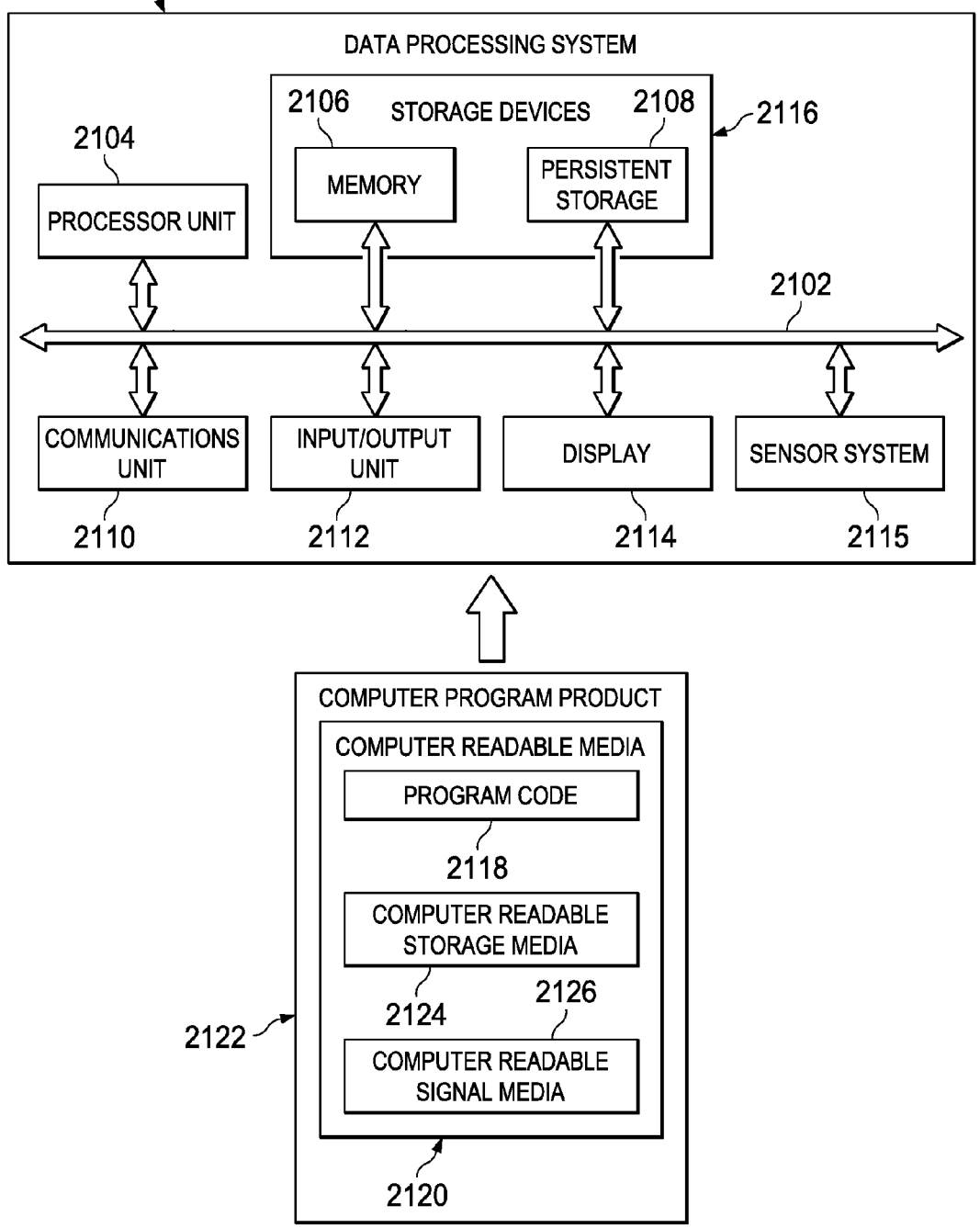
FIG. 21 is an illustration of a data processing system in accordance with an illustrative embodiment.

Turning now to FIG. 21, an illustration of a data processing system is depicted in accordance with an illustrative embodiment. Data processing system 2100 may be used to implement computer system 216, mobile display device 212, mobile display device 700, airport computer system 602, aircraft computer system 610, and computer system 504, as well as other computers or devices that may process data or other information.

In this illustrative example, data processing system 2100 includes communications framework 2102, which provides communications between processor unit 2104, memory 2106, persistent storage 2108, communications unit 2110, input/output (I/O) unit 2112, display 2114, and sensor system 2115. In this example, communication framework may take the form of a bus system.

Processor unit 2104 serves to execute instructions for software that may be loaded into memory 2106. Processor unit 2104 may be a number of processors, a multi-processor core, or some other type of processor, depending on the particular implementation.

Memory 2106 and persistent storage 2108 are examples of storage devices 2116. A storage device is any piece of hardware that is capable of storing information, such as, for example, without limitation, data, program code in functional form, and/or other suitable information either on a temporary basis and/or a permanent basis. Storage devices 2116 may also be referred to as computer readable storage devices in these illustrative examples. Memory 2106, in these examples, may be, for example, a random access memory or any other suitable volatile or non-volatile storage device. Persistent storage 2108 may take various forms, depending on the particular implementation.

For example, persistent storage 2108 may contain one or more components or devices. For example, persistent storage 2108 may be a hard drive, a flash memory, a rewritable optical disk, a rewritable magnetic tape, or some combination of the above. The media used by persistent storage 2108 also may be removable. For example, a removable hard drive may be used for persistent storage 2108.

Communications unit 2110, in these illustrative examples, provides for communications with other data processing systems or devices. In these illustrative examples, communications unit 2110 is a network interface card.

Input/output unit 2112 allows for input and output of data with other devices that may be connected to data processing system 2100. For example, input/output unit 2112 may provide a connection for user input through a keyboard, a mouse, touch screen, and/or some other suitable input device. Further, input/output unit 2112 may send output to a printer. Display 2114 provides a mechanism to display information to a user.

Sensor system 2115 is configured to generate sensor data about data processing system 2100, the environment around data processing system 2100, or both. Sensor system 2115 may include, for example, at least one of a global positioning system, an accelerometer, a camera, and other suitable types of sensors.

Instructions for the operating system, applications, and/or programs may be located in storage devices 2116, which are in communication with processor unit 2104 through communications framework 2102. The processes of the different embodiments may be performed by processor unit 2104 using computer-implemented instructions, which may be located in a memory, such as memory 2106.

These instructions are referred to as program code, computer usable program code, or computer readable program code that may be read and executed by a processor in processor unit 2104. The program code in the different embodiments may be embodied on different physical or computer readable storage media, such as memory 2106 or persistent storage 2108.

Program code 2118 is located in a functional form on computer readable media 2120 that is selectively removable and may be loaded onto or transferred to data processing system 2100 for execution by processor unit 2104. Program code 2118 and computer readable media 2120 form computer program product 2122 in these illustrative examples. In one example, computer readable media 2120 may be computer readable storage media 2124 or computer readable signal media 2126.

In these illustrative examples, computer readable storage media 2124 is a physical or tangible storage device used to store program code 2118 rather than a medium that propagates or transmits program code 2118.

Alternatively, program code 2118 may be transferred to data processing system 2100 using computer readable signal media 2126. Computer readable signal media 2126 may be, for example, a propagated data signal containing program code 2118. For example, computer readable signal media 2126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2100 are not meant to provide architectural limitations to the manner in which different embodiments may be implemented. The different illustrative embodiments may be implemented in a data processing system including components in addition to and/or in place of those illustrated for data processing system 2100. Other components shown in FIG. 21 can be varied from the illustrative examples shown. The different embodiments may be implemented using any hardware device or system capable of running program code 2118.

Illustrative embodiments of the disclosure may be described in the context of aircraft manufacturing and service method 2200 as shown in FIG. 22 and aircraft 2300 as shown in FIG. 23. Turning first to FIG. 22, an illustration of an aircraft manufacturing and service method is depicted in accordance with an illustrative embodiment. During pre-production, aircraft manufacturing and service method 2200 may include specification and design 2202 of aircraft 2300 in FIG. 23 and material procurement 2204.

During production, component and subassembly manufacturing 2206 and system integration 2208 of aircraft 2300 in FIG. 23 takes place. Thereafter, aircraft 2300 in FIG. 23 may go through certification and delivery 2210 in order to be placed in service 2212. While in service 2212 by a customer, aircraft 2300 in FIG. 23 is scheduled for routine maintenance and service 2214, which may include modification, reconfiguration, refurbishment, and other maintenance or service.

Each of the processes of aircraft manufacturing and service method 2200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 23, an illustration of an aircraft is depicted in which an illustrative embodiment may be implemented. In this example, aircraft 2300 is produced by aircraft manufacturing and service method 2200 in FIG. 22 and may include airframe 2302 with plurality of systems 2304 and interior 2306. Examples of systems 2304 include one or more of propulsion system 2308, electrical system 2310, hydraulic system 2312, and environmental system 2314. Any number of other systems may be included. Although an aerospace example is shown, different illustrative embodiments may be applied to other industries, such as the automotive industry.

Apparatus and methods embodied herein may be employed during at least one of the stages of aircraft manufacturing and service method 2200 in FIG. 22. For example, one or more illustrative embodiments may be implemented during specification and design 2202 to design aircraft 2300 to include components for a vehicle display system. In yet other illustrative examples, one or more components for a vehicle display system may be installed in aircraft 2300 during system integration 2208.

In another illustrative example, a vehicle display system may be added to aircraft 2300 during maintenance and service 2214. This vehicle display system may be added as during normal maintenance or during upgrades or refurbishment of aircraft 2300.

Thus, the illustrative embodiments provide a method and apparatus for providing increased situational awareness of an environment around a vehicle to an operator of the vehicle. In these illustrative examples, a vehicle display system may be implemented in an aircraft to provide a broader field of view than currently available through the windows in the flight deck of the aircraft.

Further, the images for the external view around the aircraft may be augmented with additional information. This additional information may provide guidance, warnings, alerts, and other types of information to aid an operator of the aircraft during operation of the aircraft on the ground. These operations may include, for example, without limitation, pre-flight inspections, taxiing, gate approaches, and other suitable operations.

Further, one or more of the illustrative embodiments may be implemented without using specially designed head-mounted displays. Instead, the illustrative examples may be implemented using mobile display devices such as a mobile phone, a tablet computer, or some other suitable type of device. In this manner, mobile display devices currently used for other applications also may include a capability for viewing external views of the aircraft. As a result, a reduction in the number of devices needed to operate an aircraft may result from using an illustrative embodiment.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a view generator configured to:
identify a position of a mobile display device relative to an exterior of a vehicle wherein the mobile display device is a tablet computer, the vehicle is an aircraft, and the mobile display device is within a flight deck on the aircraft;
identify image data from a sensor system for the vehicle that corresponds to a field of view of the mobile display device from the position of the mobile display device relative to the vehicle;
display an external view for the vehicle on the mobile display device using the image data, wherein the external view includes a view of a portion of the vehicle;
generate information about the external view displayed on the mobile display device, wherein the information about the external view includes a graphical indicator that identifies an area on ground and text that provides an alert about the area, and wherein the text indicates the alert is one or more of an engine threat, a blast, a wing clip, or a presence of ice wherein the view generator is configured to receive sensor data corresponding to the field of view of the mobile display device from the sensor system and generate the information about the external view displayed on the mobile display device using the image data; and
present the information on the mobile display device.

2. The apparatus of claim 1 further comprising:
the mobile display device.

3. The apparatus of claim 1, wherein the view generator is configured to change the image data displayed on the mobile display device to display a current external view of the vehicle from the field of view of the mobile display device when the position of the mobile display device changes.

4. The apparatus of claim 1, wherein the view generator is configured to select a camera in the sensor system generating the image data corresponding to the field of view of the mobile display device based on the position of the mobile display device.

5. The apparatus of claim 1, wherein the information presented further comprises one or more of: a video, a sound, an instruction, a caution, a guide, environmental information, and an object identifier.

6. The apparatus of claim 1, wherein the information displayed on the external view displayed on the mobile display device forms an augmented reality of the external view of the vehicle.

7. The apparatus of claim 1, wherein the sensor system is associated with at least one of the vehicle, a number of objects, and another vehicle.

8. An apparatus comprising:
a view generator configured to:
identify a position of a mobile display device relative to an exterior of a location in an aircraft, wherein the mobile display device is a tablet computer and the mobile display device is within a flight deck on the aircraft;
identify image data from a sensor system for the aircraft that corresponds to a field of view of the mobile display device from the position of the mobile display device relative to the aircraft;
display an external view for the aircraft on the mobile display device using the image data, wherein the external view includes a view of a portion of the aircraft;
generate information displayed on the mobile display device using the image data, wherein the information is about the external view including one or more of:
a first graphical indicator that identifies an area on ground and text that provides an alert about the area, wherein the text indicates the alert is one of an engine threat and a blast; and
a second graphical indicator displayed on a portion of the aircraft displayed on the mobile display device to indicate a presence of ice; and
present the information on the mobile display device.

9. The apparatus of claim 8, wherein the exterior of the location in the aircraft is selected from one of another location in the aircraft not visible from the location and an environment outside of the aircraft.

10. A method for displaying an external view of a vehicle, the method comprising:
identifying a position of a mobile display device relative to an exterior of the vehicle wherein the mobile display device is a tablet computer, the vehicle is an aircraft, and the mobile display device is within a flight deck on the aircraft;
identifying image data from a sensor system for the vehicle that corresponds to a field of view of the mobile display device from the position of the mobile display device;
displaying the external view for the vehicle on the mobile display device using the image data, wherein the external view includes a view of a portion of the vehicle;
generating information about the external view displayed on the mobile display device, wherein the information about the external view includes a graphical indicator that identifies an area on ground and text that provides an alert about the area, and wherein the text indicates the alert is one or more of an engine threat, a blast, a wing clip, or a presence of ice; and
presenting the information on the mobile display device.

11. The method of claim 10 further comprising:
identifying the field of view of the mobile display device at the position of the mobile display device, and
wherein displaying the image data on the mobile display device comprises:
displaying the image data on the mobile display device with the field of view identified for the mobile display device.

12. The method of claim 10 further comprising:
changing the external view displayed on the mobile display device to display a current external view of the vehicle from the field of view of the mobile display device when the position of the mobile display device changes.

13. The method of claim 10 further comprising:
selecting a camera in the sensor system generating the image data corresponding to the field of view of the mobile display device based on the position of the mobile display device.

14. The method of claim 10 further comprising:
receiving sensor data corresponding to the field of view of the mobile display device from the sensor system; and
generating the information about the external view displayed on the mobile display device using the image data.

15. The method of claim 14, wherein the information presented further comprises one or more of: a video, a sound, an instruction, a caution, a guide, environmental information, and an object identifier.

16. The method of claim 10, wherein the mobile display device is in a location selected from one of an interior of the vehicle, a side of the vehicle, and the exterior of the vehicle.

17. The method of claim 10, wherein the sensor system is associated with at least one of the vehicle, a number of objects, and another vehicle.

18. The apparatus of claim 1, wherein the graphical indicator is a first graphical indicator, the information about the external view further comprises:
a second graphical indicator displayed on a portion of the vehicle displayed on the mobile display device to indicate the presence of ice.

19. The apparatus of claim 8,
wherein the text indicates the alert is one of a wing clip, the engine threat and the blast.

* * * * *